United States Patent [19]

Oury et al.

[11] Patent Number: 5,203,442
[45] Date of Patent: Apr. 20, 1993

[54] CANTILEVER CONVEYING TECHNIQUES

[75] Inventors: Robert F. Oury, Gilberts; A. Steven Ledger, Addison, both of Ill.

[73] Assignee: Rotec Industries, Inc., Elmhurst, Ill.

[21] Appl. No.: 693,914

[22] Filed: Apr. 29, 1991

[51] Int. Cl.⁵ .............................................. B65G 15/26
[52] U.S. Cl. .................... 198/313; 198/812; 198/316.1
[58] Field of Search ............... 198/311, 312, 313, 314, 198/316.1, 317, 318, 812

[56] References Cited

U.S. PATENT DOCUMENTS

| | | | |
|---|---|---|---|
| Re. 29,110 | 1/1977 | Oury | 198/314 |
| 3,402,805 | 9/1968 | Spellman, Jr. | 198/812 X |
| 3,613,866 | 10/1971 | Arndt | 198/313 X |
| 3,675,762 | 7/1972 | Arndt | 198/588 |
| 3,825,107 | 7/1974 | Cary et al. | 198/313 |
| 3,945,484 | 3/1976 | Oury | 198/313 |
| 4,345,680 | 8/1982 | Kay | 198/311 X |
| 4,523,669 | 6/1985 | Smith | 198/313 |
| 4,624,357 | 11/1986 | Oury et al. | 198/313 |

FOREIGN PATENT DOCUMENTS

| | | | |
|---|---|---|---|
| 8105476 | 7/1983 | Netherlands | 198/812 |
| 0664342 | 2/1988 | Switzerland | 198/812 |

Primary Examiner—Robert P. Olszewski
Assistant Examiner—James R. Bidwell
Attorney, Agent, or Firm—Allegretti & Witcoff, Ltd.

[57] ABSTRACT

A self-propelled vehicle mounting a cantilevered conveyor truss for concrete and the like. An improved force balancing frame enables the vehicle to remain stable even though the truss conveyor is extended to maximum length and elevated to a high angle. Improved geometry enables the truss conveyor to be pivoted at a point above a cab mounted on a turntable of the vehicle and forward of the axis of rotation of the turntable, thereby facilitating the deposit of concrete on the conveyor. Polyethylene pads control the motion of the truss conveyors, especially when the truss conveyor is elevated to a high angle. A unique drive assembly enables a mid-section and fly section of the truss conveyor to be moved simultaneously with respect to a base section of truss conveyor such that the fly section moves at twice the rate of the mid-section.

30 Claims, 21 Drawing Sheets

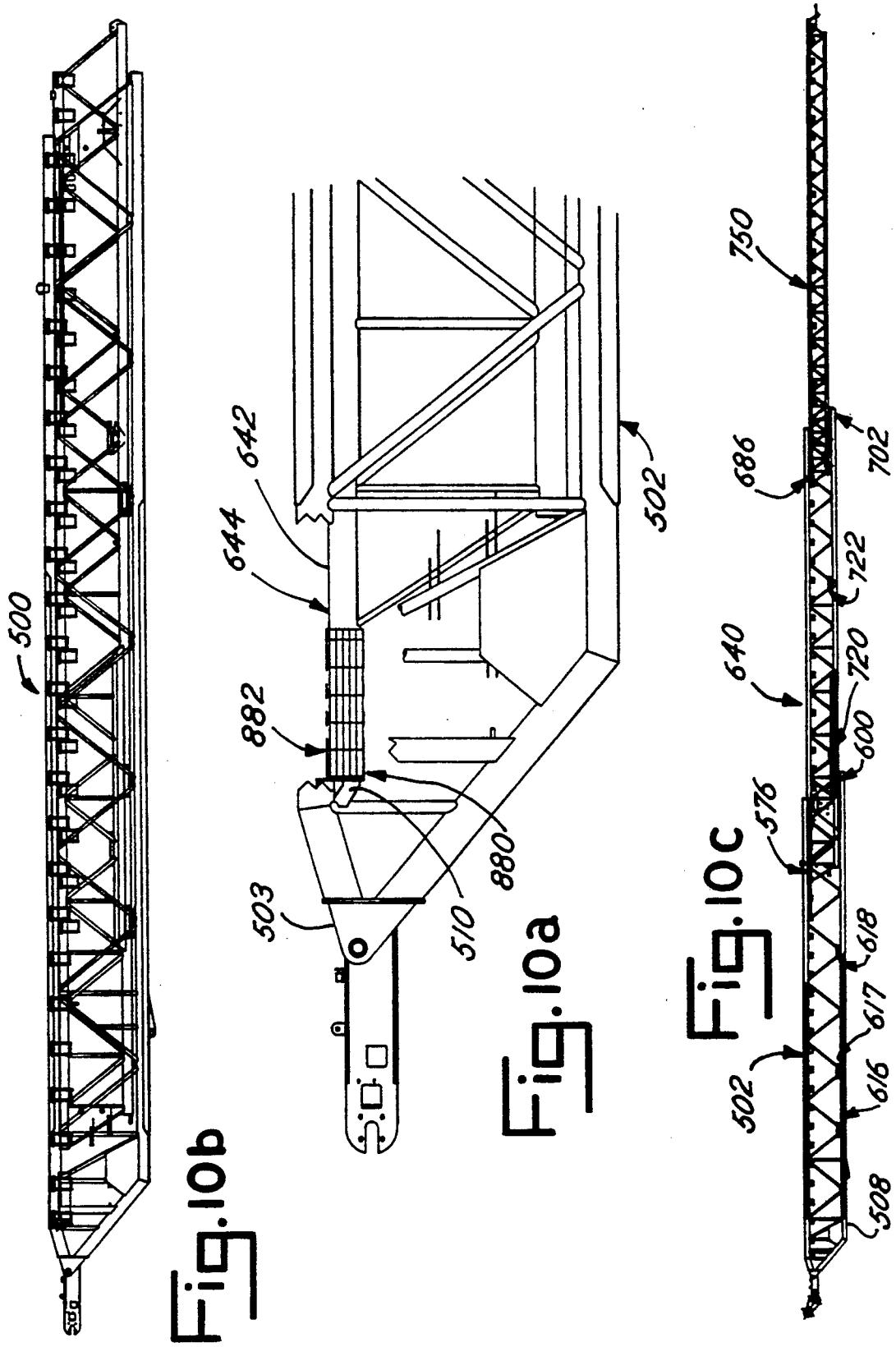

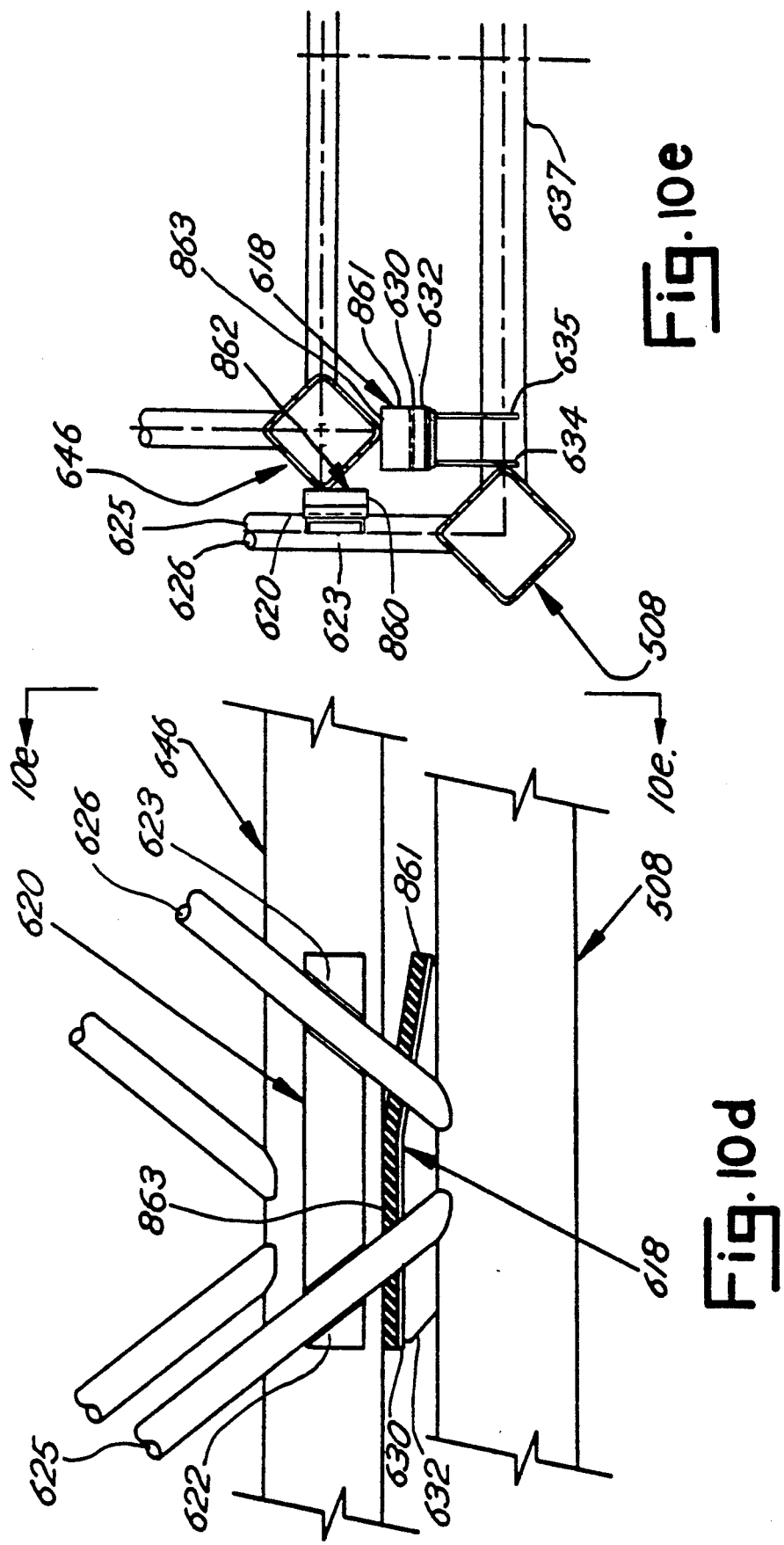

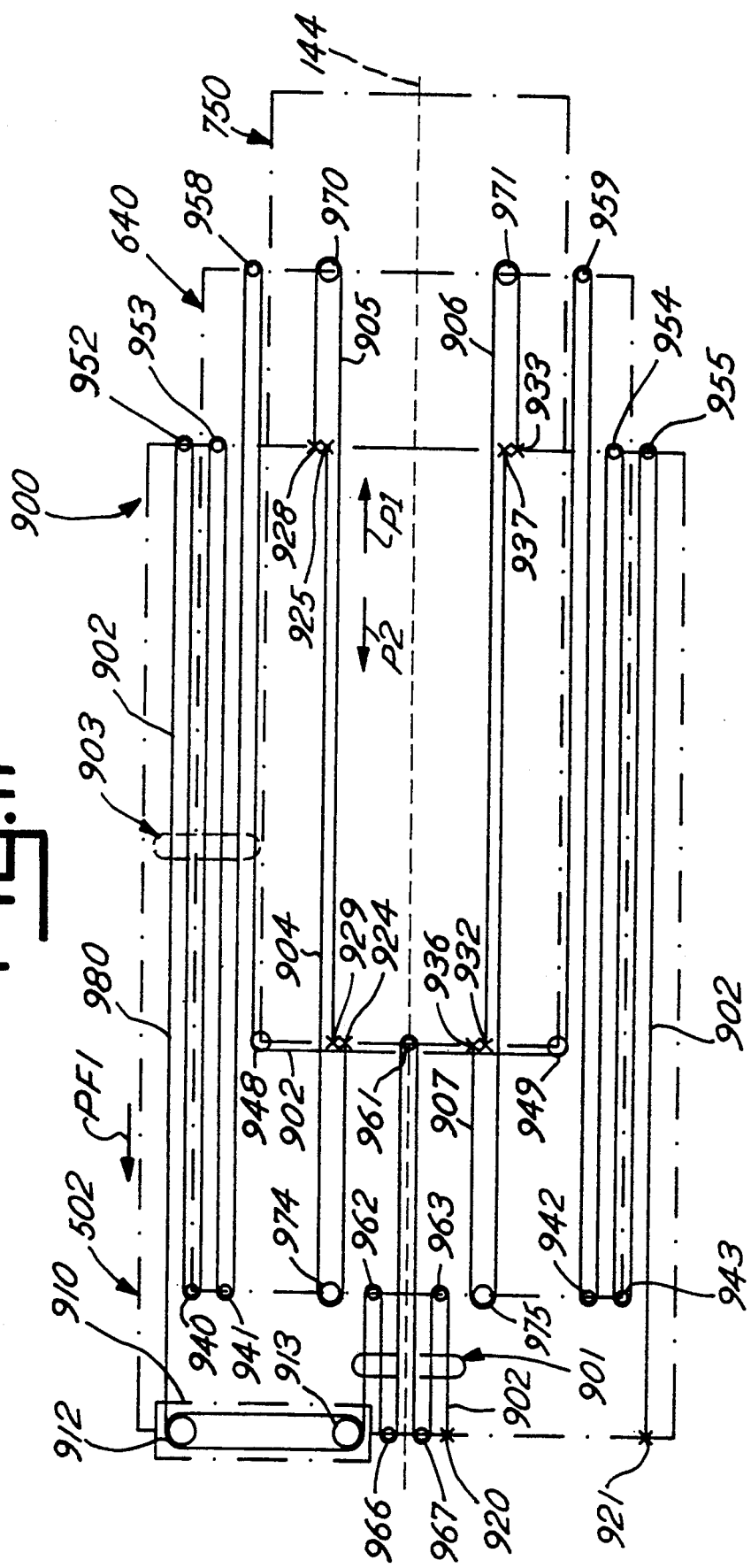

CANTILEVER CONVEYING TECHNIQUES

BACKGROUND OF THE INVENTION

1. Field of the Invention

This invention generally relates to conveyors, and more particularly relates to cantilevered conveyors capable of transporting concrete and the like over a long span.

2. Description of Related Art

Cantilevered conveyors mounted on self-propelled vehicles for transporting concrete and the like have been known in the past and are described in U.S. Pat. Nos. 3,675,762; 4,624,357; and Re. 29,110. A system for using a single belt with multiple cantilevered conveyors is disclosed in U.S. Pat. No. 3,945,484.

Although self-propelled cantilevered conveyors have been made in the past, they have been subject to design deficiencies which have limited their overall usefulness for many applications. For example, prior arrangements of cantilevered conveyors on a self-propelled vehicle have precluded maximum extension and free rotation of the cantilevered conveyors when used in combination with a feeder conveyor that supplies concrete to the cantilevered conveyors through a swivel transfer unit. Prior cantilevered conveyors also have been limited to a relatively short span due to the inadequacies of the force balancing characteristics of the frames supporting the conveyors. In addition, prior conveyor suspension systems have provided inadequate control of conveyor movement over long spans. The prior art techniques also have failed to properly control the extension and retraction of conveyors to enable concrete to be accurately poured over long spans.

Accordingly, it is a principal object of the present invention to optimize the placement of a cantilevered conveyor on a vehicle so that the conveyor can be rotated through a wide area and elevated to various angles while continuously being provided with concrete or the like from a stationary feeder conveyor operating through a swivel transfer unit.

Another object of the invention is to provide a force balancing frame that enables a cantilevered conveyor to transport concrete over long spans.

Yet another object of the present invention is to provide an improved means of suspending telescoping conveyors so that the movement of the conveyors is easily controlled even when the conveyors are elevated to high angles.

Still another object of the present invention is to provide an improved drive arrangement for simultaneously moving sections of a cantilevered conveyor with improved accuracy and safety.

SUMMARY OF THE INVENTION

One aspect of the invention utilizes a self-propelled vehicle having wheel supporting axles that define a first reference plane. A conveyor for transporting concrete and the like in a predetermined first path direction defines a second reference plane perpendicular to the first reference plane. A turntable is supported for rotation on the vehicle around an axis of rotation perpendicular to the first reference plane, and defines a third reference plane perpendicular to the second reference plane and collinear with the axis of rotation. A truss supports the conveyor on the turntable for rotation around a pivot axis. A drive arrangement extends the truss and the conveyor in the first path direction and retracts the truss and the conveyor in a second path direction opposite the first path direction. Transfer apparatus transfers concrete or the like to the conveyor so that the concrete is transported to the cantilevered end of the conveyor during operation. An elevating device, such as hydraulic cylinders and pistons, are supported on a first segment of the turntable located on the first side of the third reference plane for rotating the truss around the pivot axis. A cab also is carried on the turntable and is located on one side of the second reference plane so that an operator can control the vehicle and conveyor. The cab has a top surface that defines a fourth reference plane parallel to the first reference plane. A counterbalance carried by the turntable is located on a second side of the third reference plane opposite the first side for counterbalancing the weight of the truss and the conveyor. A unique force balancing frame supports the truss and the counterbalance on the turntable such that the second reference plane passes through the turntable and the counterbalance. The frame also positions the pivot axis above the fourth reference plane and perpendicular to the second reference plane on the first side of the third reference plane. This unique arrangement enables concrete to be transferred from the transfer apparatus to the conveyor while the turntable is rotating around the axis of rotation and the truss is rotating around the pivot axis. An operator is able to view the entire operation of the conveyor while maintaining complete control of the conveying process. By using the foregoing aspect of the invention, the conveyor may be extended to maximum length and concrete may be continuously fed to the conveyor through a stationary transfer device while the turntable is rotated 360° and elevated to various angles. This is a substantial advantage over the prior arrangements which required some movement of the transfer device with respect to the conveyor during rotation.

According to another aspect of the invention, the truss is divided into first, second and third sections which telescope with respect to each other. The movement of the second and third sections is controlled by a pad arrangement carried by the first section for slidably supporting the second section on a supporting surface. A second pad arrangement also is carried by the second section for slidably supporting the third section on a supporting surface. A preferred material for the pads is polyethylene. By using the unique pad arrangement, an operator of the conveyor is protected in the event that the drive arrangement fails to control the movement of the second and third sections. This aspect of the invention is particularly useful when the truss and conveyor are raised high elevational angles and enables conveyor sections to be moved with a degree of accuracy, reliability and safety previously unavailable.

According to another aspect of the invention, a first cable is provided for extending or retracting the second and third sections of the truss and conveyor. A second cable arrangement is provided for equalizing the extension and retraction of the second and third sections. A cable drive applies to the first cable an extension force or a retraction force. First extension pulleys engage the first cable and are connected to the inner end portions of the second and third sections for simultaneously urging the second and third sections in an extension direction in response to the application of a component of force in that direction. Second extension pulleys also engage the first cable and are connected to the outer end portions of the first and second sections for enabling the first cable to apply a component of force to the extension pulleys in the extension direction in response to operation of the cable drive. First retraction pulleys also engage the first cable and are connected to the inner end portions of the second and third sections for simultaneously urging the second and third sections in the retraction direction in response to the application of the component of force in the retraction direction. Second retraction pulleys engage the first cable and are connected to the inner end portion of the first section for enabling the first cable to apply a component of force to the first retraction pulleys in the retraction direction in response to the operation of the cable drive. Equalizer pulleys engage the second cable arrangement and are connected to the inner end portions of the second and third sections for urging the second and third sections to move simultaneously at predetermined rates relative to the first section. By using this unique arrangement, the second and third sections can be moved simultaneously with respect to the first section. In particular, the third section can be moved at double the rate of the second section with respect to the first section. Experience has shown that this arrangement is important for enabling an operator to accurately control the movement of the conveyor over long spans. In addition, a precisely controlled movement of the second and third sections enables an operator to accurately predict the exact length of the conveyor at any point in time, thereby increasing the accuracy with which concrete can be dispensed.

According to another aspect of the invention, the elevating device transfers a first component of force to the turntable that urges the first segment of the turntable toward the third reference plane in a first component direction parallel to the first reference plane. The force balancing frame is responsive to the weight of the truss and the conveyor for transferring a second component of force to the turntable that opposes the first component of force. The frame also is responsive to the weight of the counterbalance for transferring a third component of force to the turntable that urges the turntable in a third component direction parallel to the axis of rotation of the turntable. The frame also is responsive to the weight of the truss and the conveyor for transferring a fourth component of force to the turntable that opposes the third component of force so that the reach of the truss and conveyor can be extended while maintaining the stability of the vehicle on which the turntable is mounted. By using the foregoing unique components, the applicants have been able to transport concrete and the like over a span of two hundred feet. In addition, the unique frame enables the truss and conveyor to be elevated to angles both above and below a horizontal plane while maintaining the stability of the vehicle on which the truss and conveyor are mounted. This arrangement enables concrete to be transported and deposited with a degree of accuracy and convenience previously unavailable.

DESCRIPTION OF THE DRAWINGS

These and other objects, advantages and features of the present invention will hereafter appear for purposes of illustration, but not of limitation, in connection with the accompanying drawings in which like numbers refer to like parts throughout, and in which:

FIG. 10a is an enlarged, side elevational, fragmentary view of a portion of the truss shown in FIG. 1;

FIG. 10b is a side elevational view of the truss and conveyor illustrated in FIG. 1 showing additional detail;

FIG. 10c is a side elevational view of the truss and conveyor shown in FIG. 10b in the extended position and illustrating the positions of various rockers and guides;

FIG. 10d is an enlarged, fragmentary side elevational view of the truss shown in FIG. 10b;

FIG. 10e is a cross sectional view taken along line 10e-10e of FIG. 10d;

FIG. 11 is a schematic top plan view of a preferred form of cable and drive apparatus in the retracted position made accordance with the present invention;

DESCRIPTION OF THE PREFERRED EMBODIMENT

Figure 1:
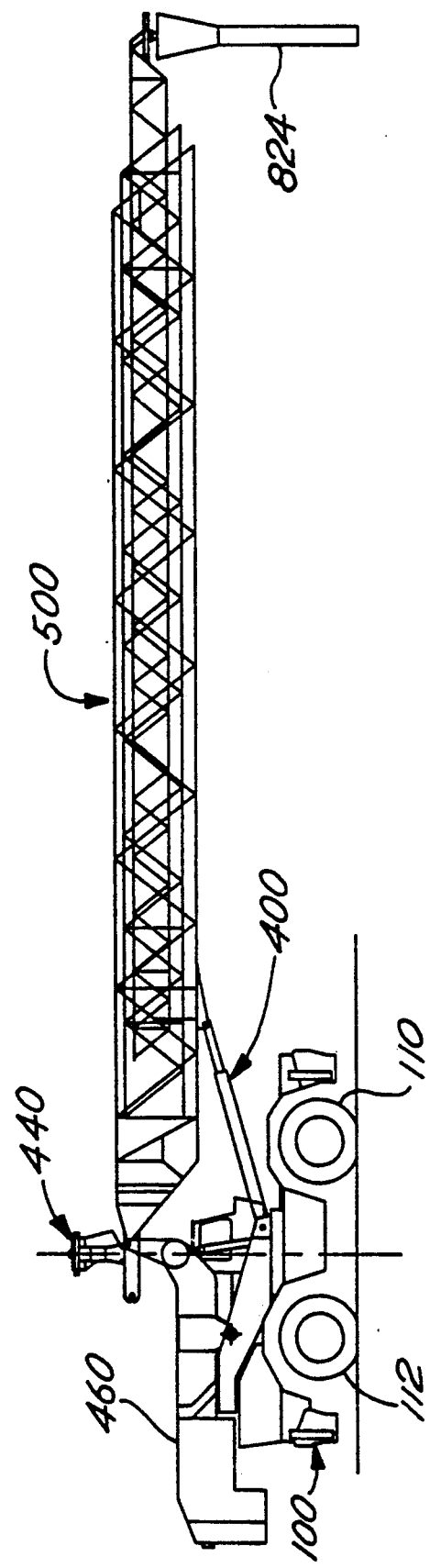
FIG. 1 is a side elevational, partially schematic view of a preferred form of the present invention employing a counterweight, truss and conveyor in a retracted position.
Figure 2:
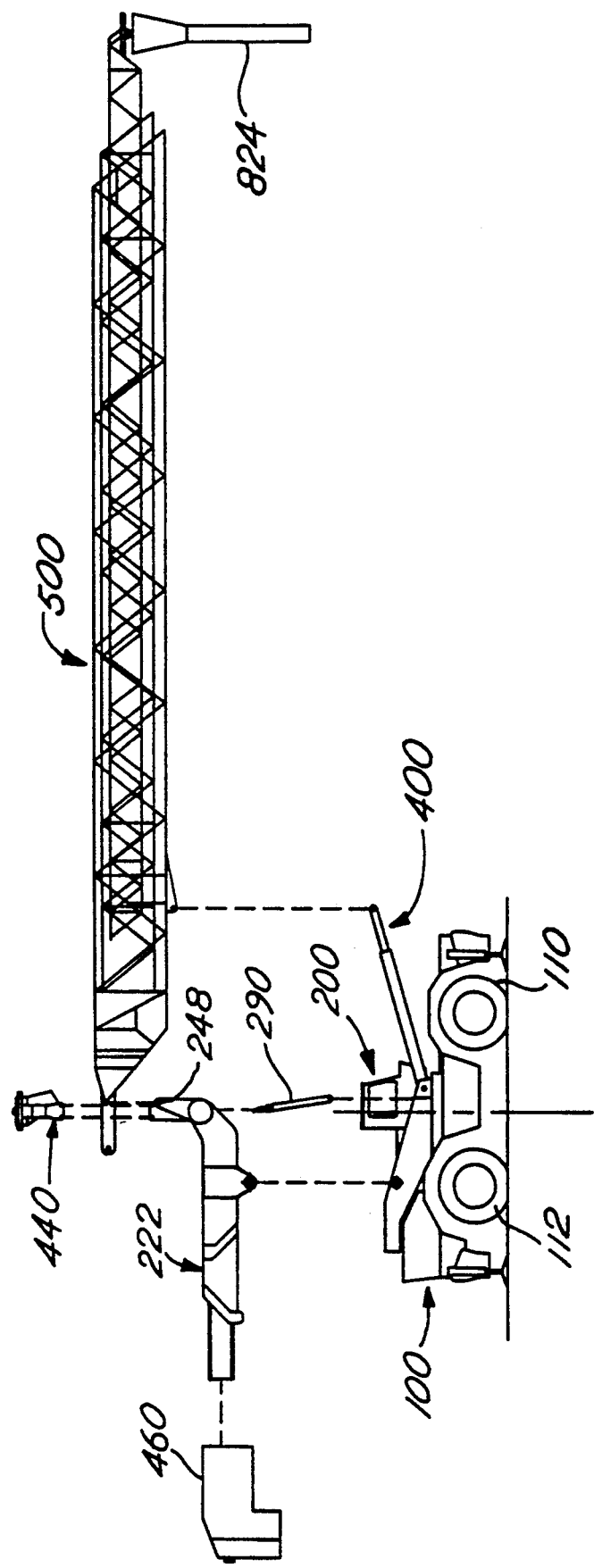
FIG. 2 is an exploded view of the apparatus shown in FIG. 1.

Referring to the drawings, a preferred form of apparatus made in accordance with the present invention basically comprises a self-propelled crane 100, a turntable assembly 130, a cab assembly 200, a frame balancing assembly 220, an elevating assembly 400, a swivel transfer assembly 440, a truss assembly 500, a conveyor assembly 800, a pad assembly 840, a bumper assembly 880, and a drive assembly 900.

Figure 4:
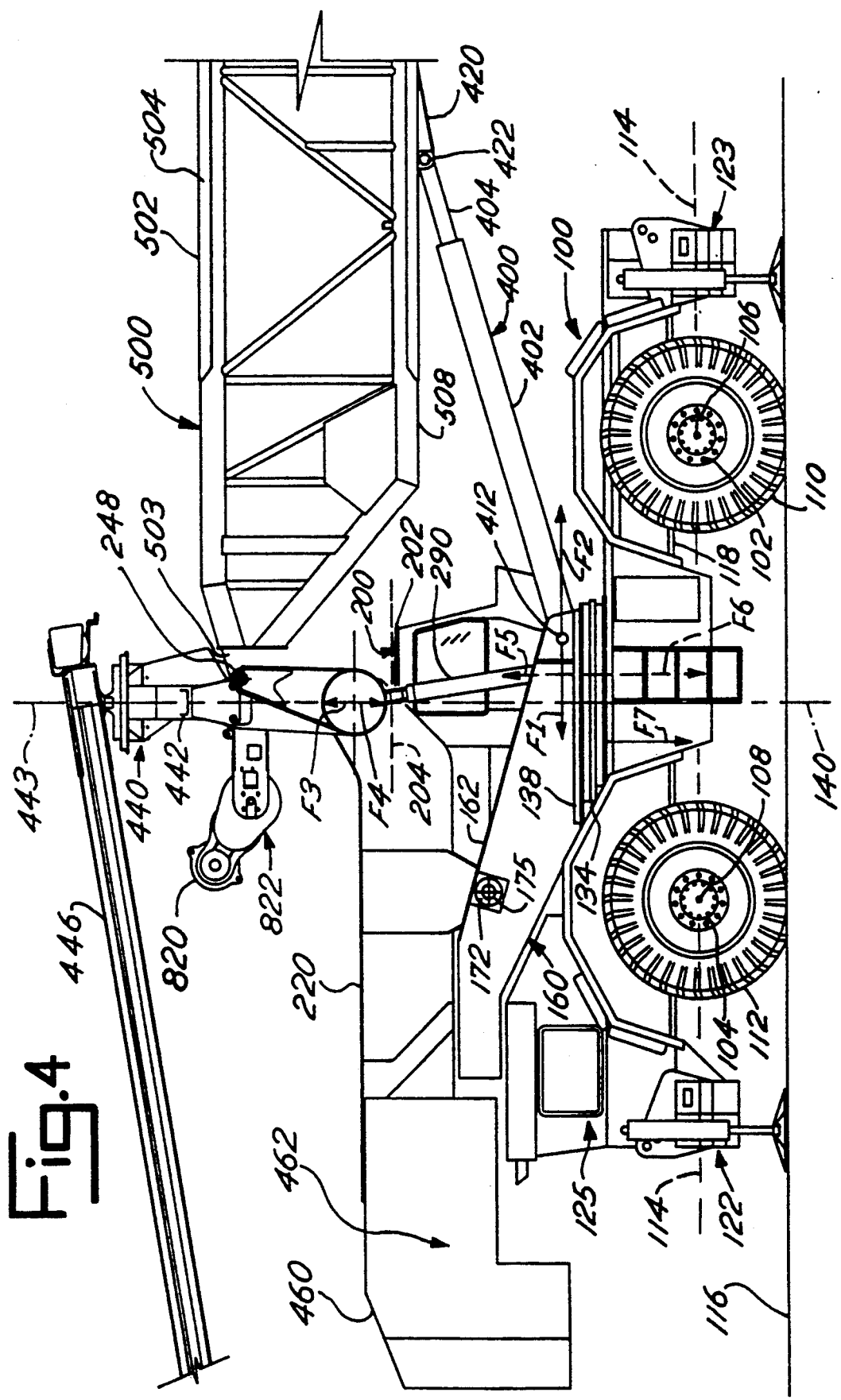
FIG. 4 is an enlarged, detailed fragmentary view of the apparatus shown in FIG. 1 in which the truss and conveyor are being fed with concrete by a feeder conveyor through a swivel transfer unit.
Figure 5:
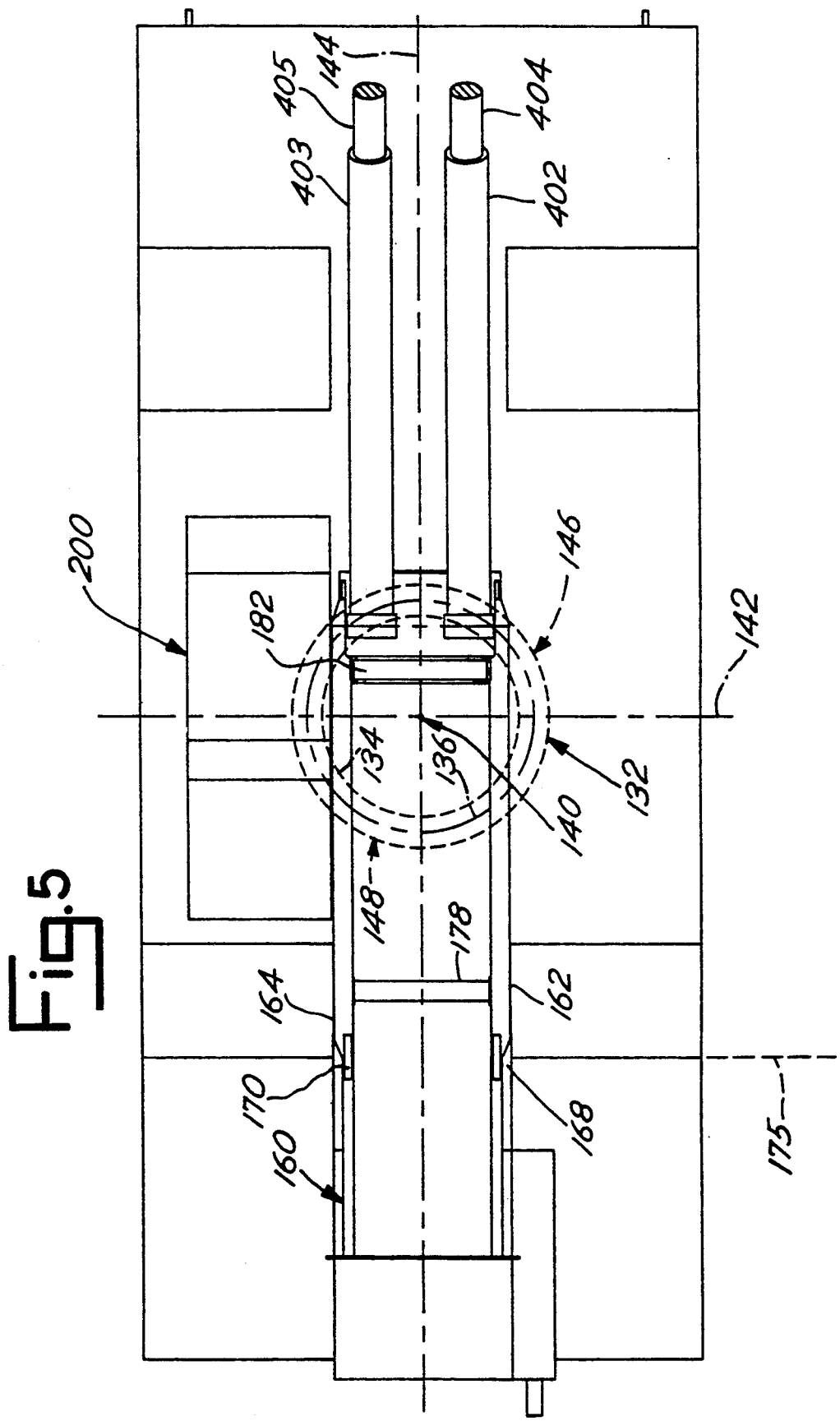
FIG. 5 is a top plan view of the apparatus shown in FIG. 4 with some upper structure removed.

Referring to FIGS. 4 and 5, crane 100 comprises a front axle 102 defining a front center line 106 and a rear axle 104 defining a rear center line 108. Each of the axles supports two wheels, including a front wheel 110 and a rear wheel 112. Center lines 106 and 108 define a reference plane 114 that is generally parallel to a surface 116 supporting crane 100.

Figure 6:
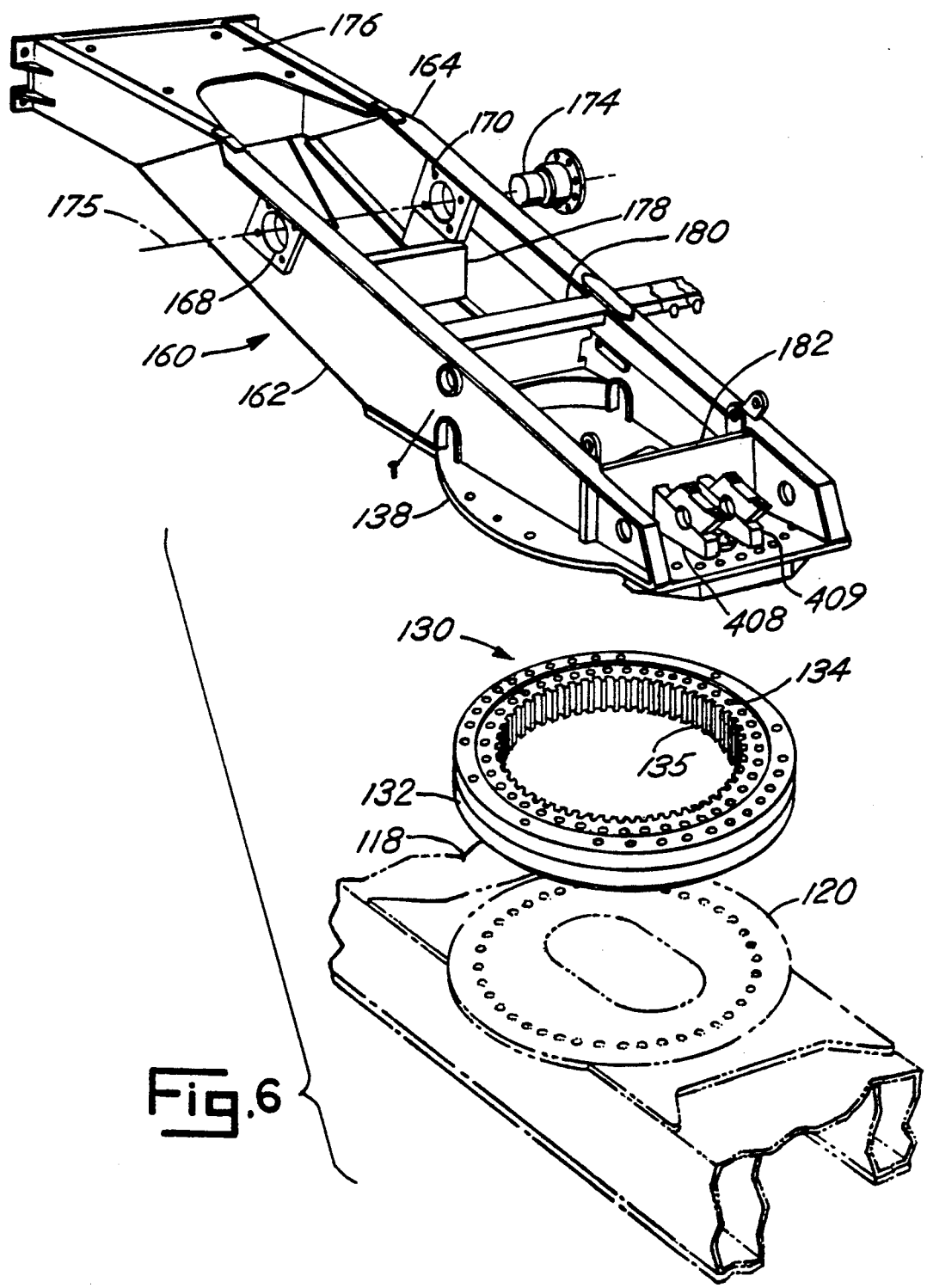
FIG. 6 is a perspective view of a portion of the apparatus shown in FIG. 5.

Axles 102 and 104 support a frame 118 that carries a generally circular plate 120 (FIG. 6). Crane 100 is fitted with a stabilizing pad assembly adjacent each wheel, including a front stabilizer pad 123 and a rear stabilizer pad 122. Crane 100 is propelled and operated by a conventional engine and transmission 125.

Referring to FIGS. 5 and 6, turntable assembly 130 comprises a fixed bearing race 132 attached to frame 118 and a movable race 134 defining a circular gear 135 driven by an additional pinion gear (not shown). Bearing races 132 and 134 are rotatably mounted on a ball bearing assembly schematically shown by dotted line 136 (FIG. 5). A generally circular table 138 is fixed to movable race 134 for rotation around an axis of rotation 140. Referring to FIG. 5, table 138 defines a reference plane 142 collinear with axis 140 and perpendicular to reference plane 114 (FIG. 4). Table 138 also defines a reference plane 144 collinear with an axis 140 and perpendicular to both plane 142 and plane 114. Plane 142 divides table 138 into a first segment 146 on one side of table 138 and a second segment 148 located on a second side of table 138 opposite side 146.

Referring to FIGS. 4-6, turntable assembly 130 also includes a shipper assembly 160 bolted at its lower edge to table 138. Shipper assembly 160 includes generally parallel frame members 162 and 164 that are fitted with journal boxes 168 and 170 adapted to receive pins 172 and 174, respectively, for defining a pivot axis 175. Shipper assembly 160 is reinforced and positioned by cross braces 176, 178, 180 and 182 (FIG. 6).

Referring to FIGS. 4 and 5, cab assembly 200 is carried by turntable assembly 130 and comprises a roof 202 that defines a reference plane 204 parallel to plane 114. The cab includes conventional controls for driving self-propelled crane 100, for rotating turntable assembly 130 and elevating truss assembly 500.

Figure 13:
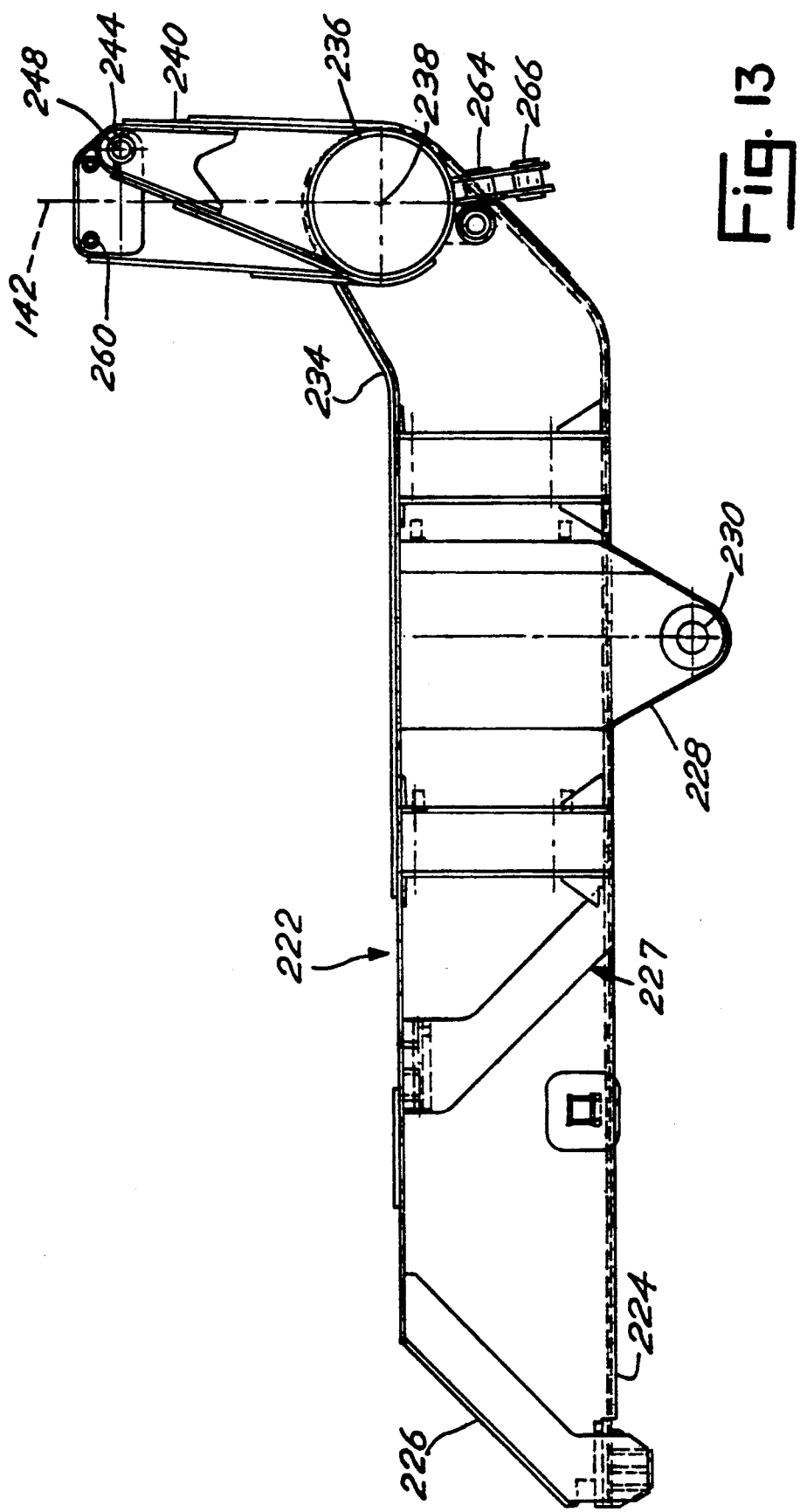
FIG. 13 is a side elevational view of a preferred form of support weldment made in accordance with the present invention.
Figure 14:
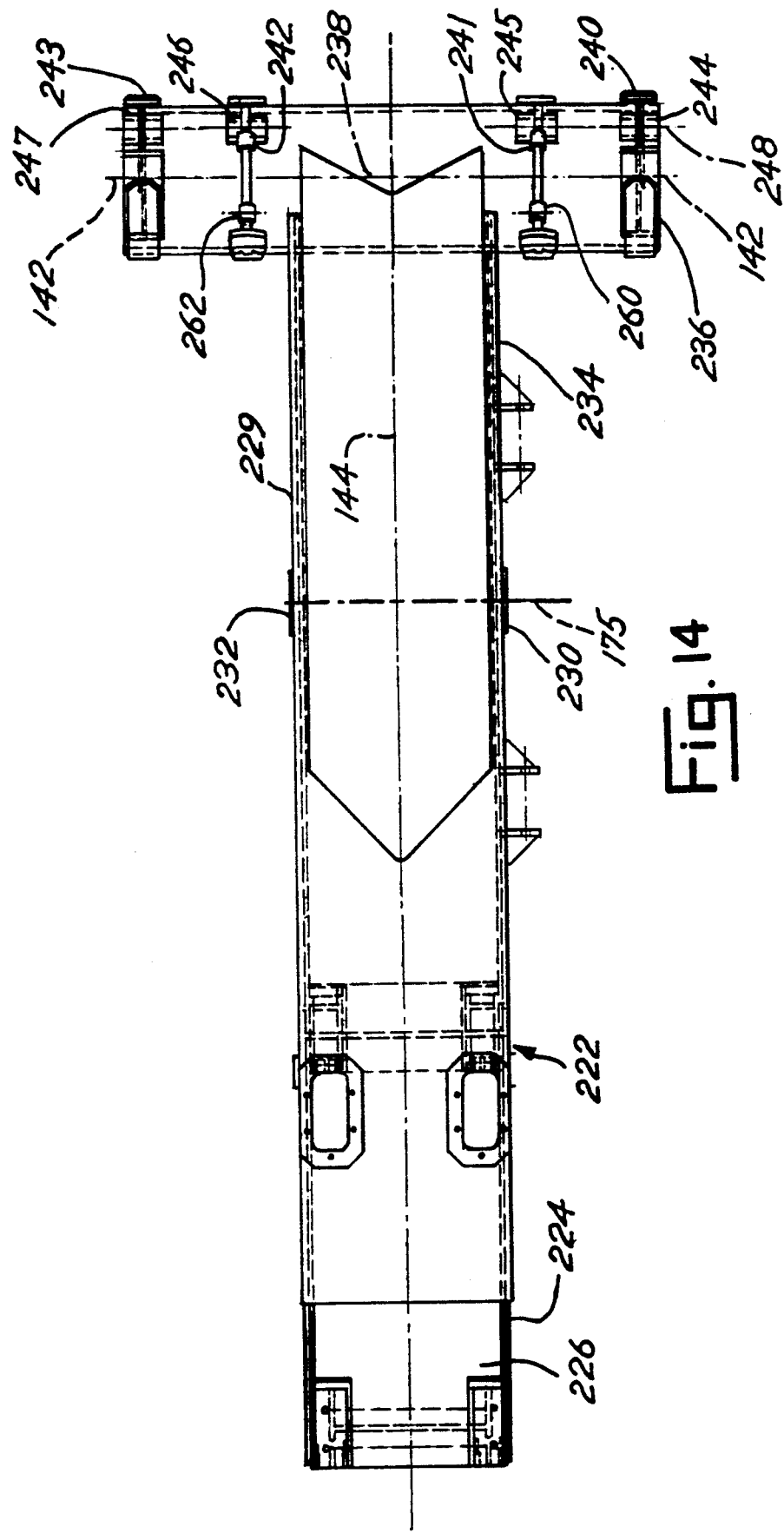
FIG. 14 is a top plan view of the support weldment shown in FIG. 13.
Figure 15:
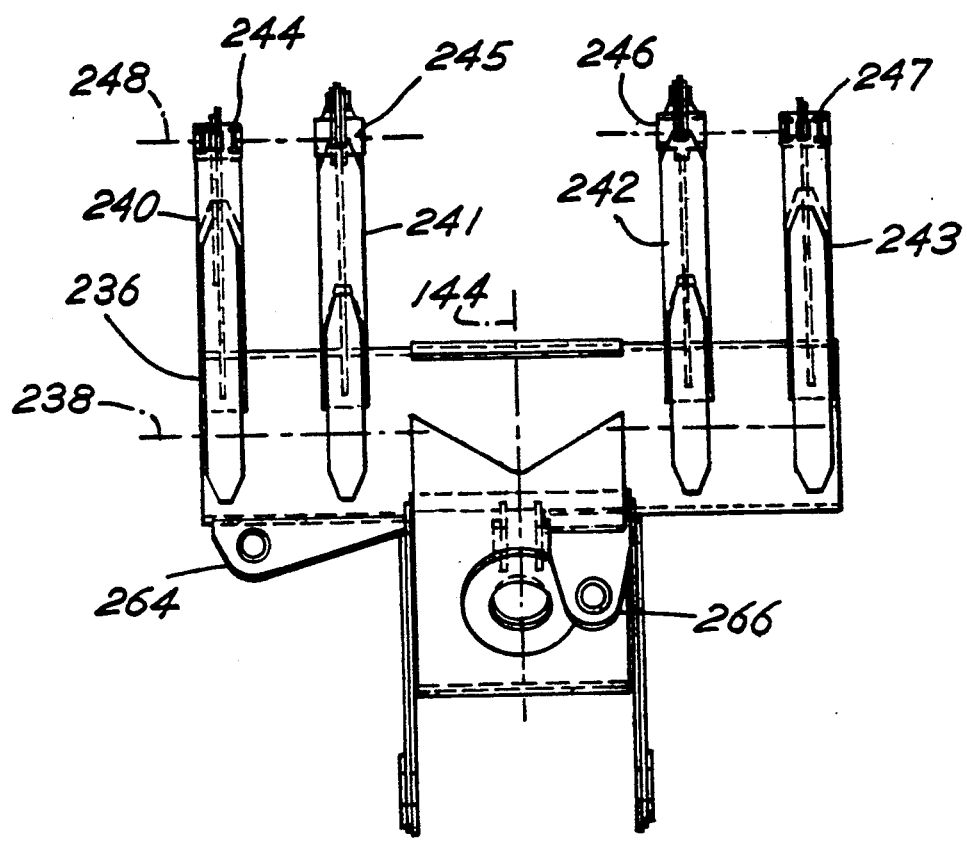
FIG. 15 is an end view of the support weldment shown in FIG. 13 as viewed from the right in FIG. 13.

Referring to FIGS. 4 and 13-15, frame balancing assembly 220 is supported on turntable assembly 130 for rotation with table 138. The assembly includes a support weldment 222, a balance strut 290 and a beam assembly 330. Referring to FIGS. 13-15, support weldment 222 includes a hollow rear frame portion 224 that defines a rear sloping surface 226. Frame portion 224 is reinforced by braces, such as brace 227. Depending flanges 228 and 229 are welded to the lower portion of weldment 222 and are arranged to support journal boxes 230 and 232 that receive pins 272 and 274, respectively. The journal boxes and pins support weldment 222 on axis 175.

Weldment 222 also includes a forward frame portion 234, including a cylinder 236 that defines a central axis 238 (FIG. 13) collinear with reference plane 142. Cylinder 236 supports truss struts 240-243 that are fitted with journal boxes 244-247 defining a pivot axis 248. Cylinder 236 also supports transfer struts 260 and 262, as well as depending strut support flanges 264 and 266 (FIGS. 13 and 15).

Figure 16:
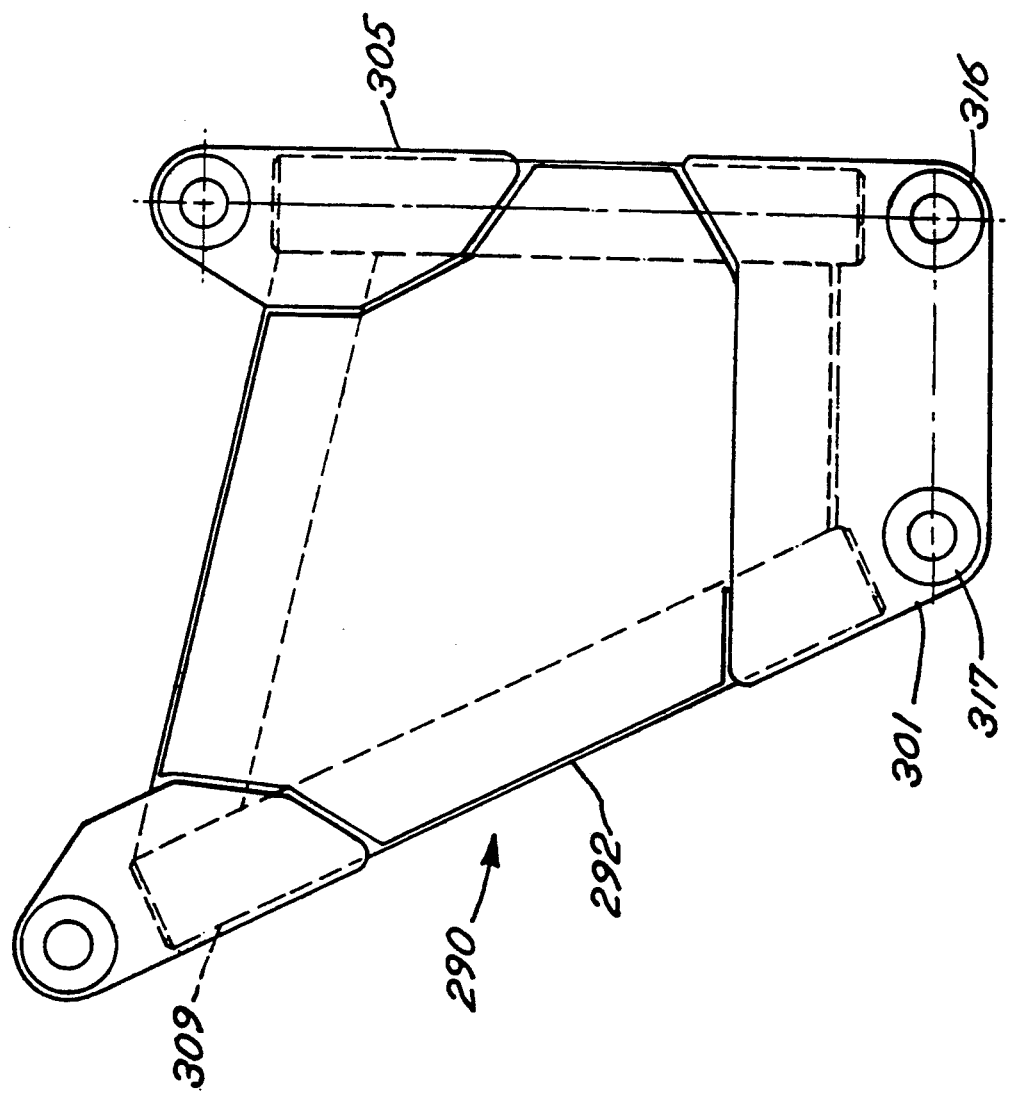
FIG. 16 is a front elevational view of a preferred form of balance strut made in accordance with the present invention.
Figure 17:
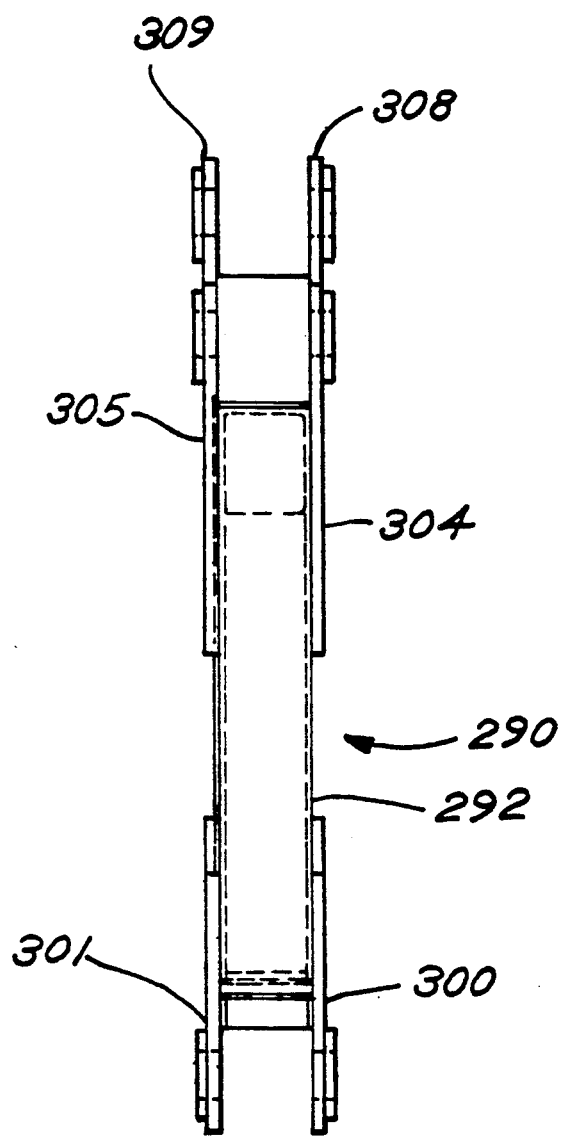
FIG. 17 is a side elevational view of the balance strut shown in FIG. 16 as viewed from the right in FIG. 16.

Referring to FIGS. 16 and 17, balance strut 290 comprises a central frame 292 that supports flange pairs 300, 301; 304, 305; and 308, 309. Flange pairs 300 and 301 are attached to corresponding flanges of table 138 (not shown) in segment 146 (FIG. 5). Flange pairs 304 and 305 are attached to flange 266 (FIG. 15) and flange pairs 308 and 309 are attached to flange 264 (FIG. 15).

Figure 18:
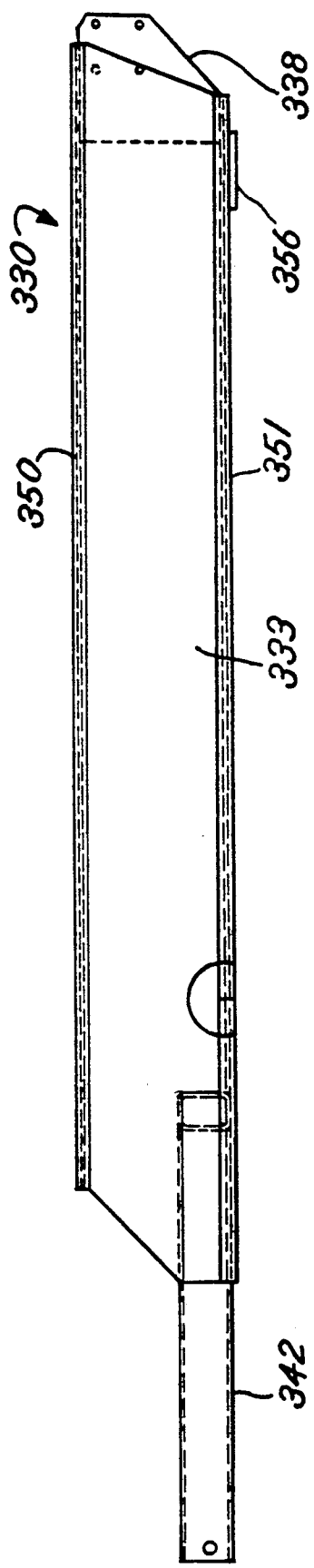
FIG. 18 is a side elevational view of a preferred form of beam assembly made in accordance with the present invention.
Figure 19:
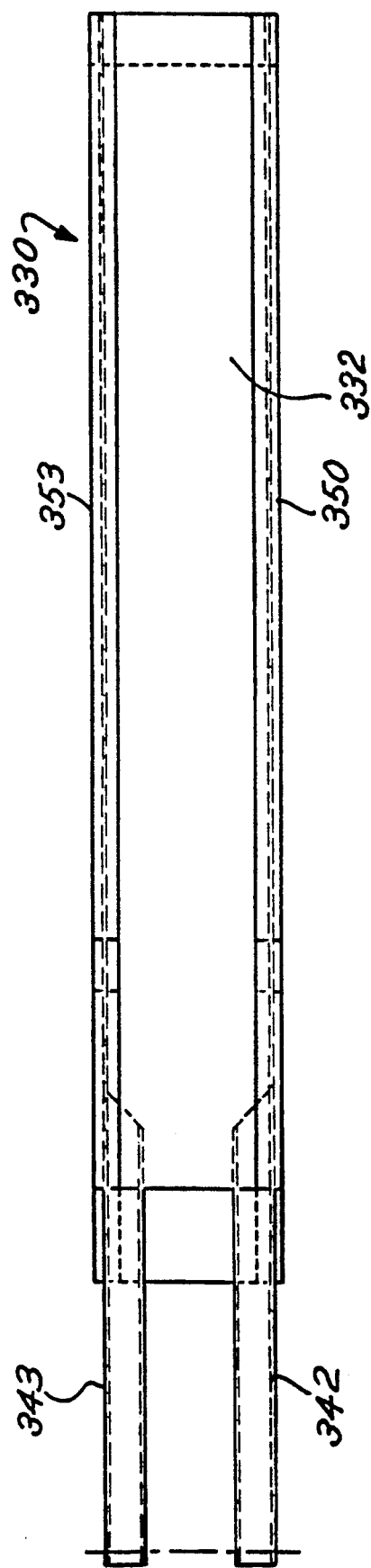
FIG. 19 is a top plan view of the beam assembly shown in FIG. 18 with an inner reinforcement flange removed at the right hand edge.
Figure 20:
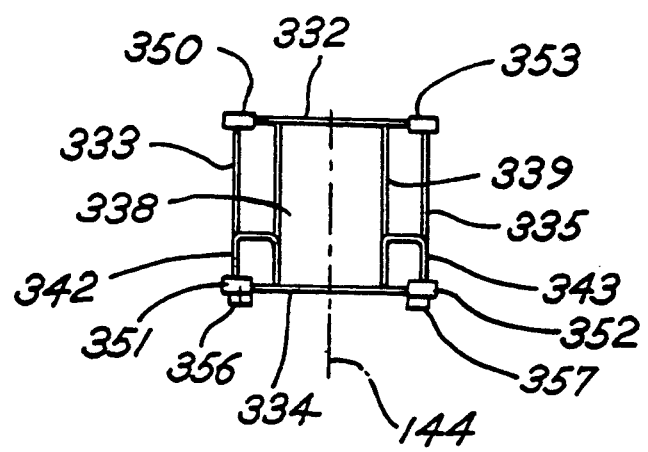
FIG. 20 is an end elevational view of the beam assembly shown in FIG. 18 as viewed from the right in FIG. 18.

Referring to FIGS. 18-20, beam assembly 330 comprises frame members 332-335 that are reinforced by inner flanges 338 and 339. Mounting tubes 342 and 343 are welded to the frame members in the positions shown. Corner guide beams 350-353 enable beam assembly 330 to be telescoped within support weldment 222. Stop guides 356 and 357 prevent the beam assembly from extending too far into support weldment 222 and from extending too far beyond the rear portion of support weldment 222.

Referring to FIGS. 4 and 5, elevating assembly 400 is carried by table 138 and includes hydraulic lift cylinders 402 and 403 that comate with movable pistons 404 and 405, respectively. The lower ends of cylinders 402 and 403 are rotatably mounted in turntable flanges 408 and 409, respectively (FIG. 6). The cylinders rotate around a pin 412 (FIG. 4) that is fitted through flanges 408 and 409. The upper ends of pistons 404 and 405 are rotatably mounted to a pair of truss flanges, including a flange 420 welded to truss assembly 500 in the position shown. The pistons are rotatable around a pair of pins that fit through openings in the flanges, such as pin 422 (FIG. 4).

Referring to FIG. 4, swivel transfer assembly has a pair of flanges, including a flange 442, that are secured to transfer support struts 260 and 262 (FIGS. 13-14). Swivel transfer assemblies are well known in the prior art and need not be described in detail. Assembly 440 defines a central axis 443 that is collinear with turntable axis 140 (FIG. 4). Concrete preferably is conveyed to swivel transfer assembly 440 by means of a conventional feeder conveyor 446 (FIG. 4).

Figure 7:
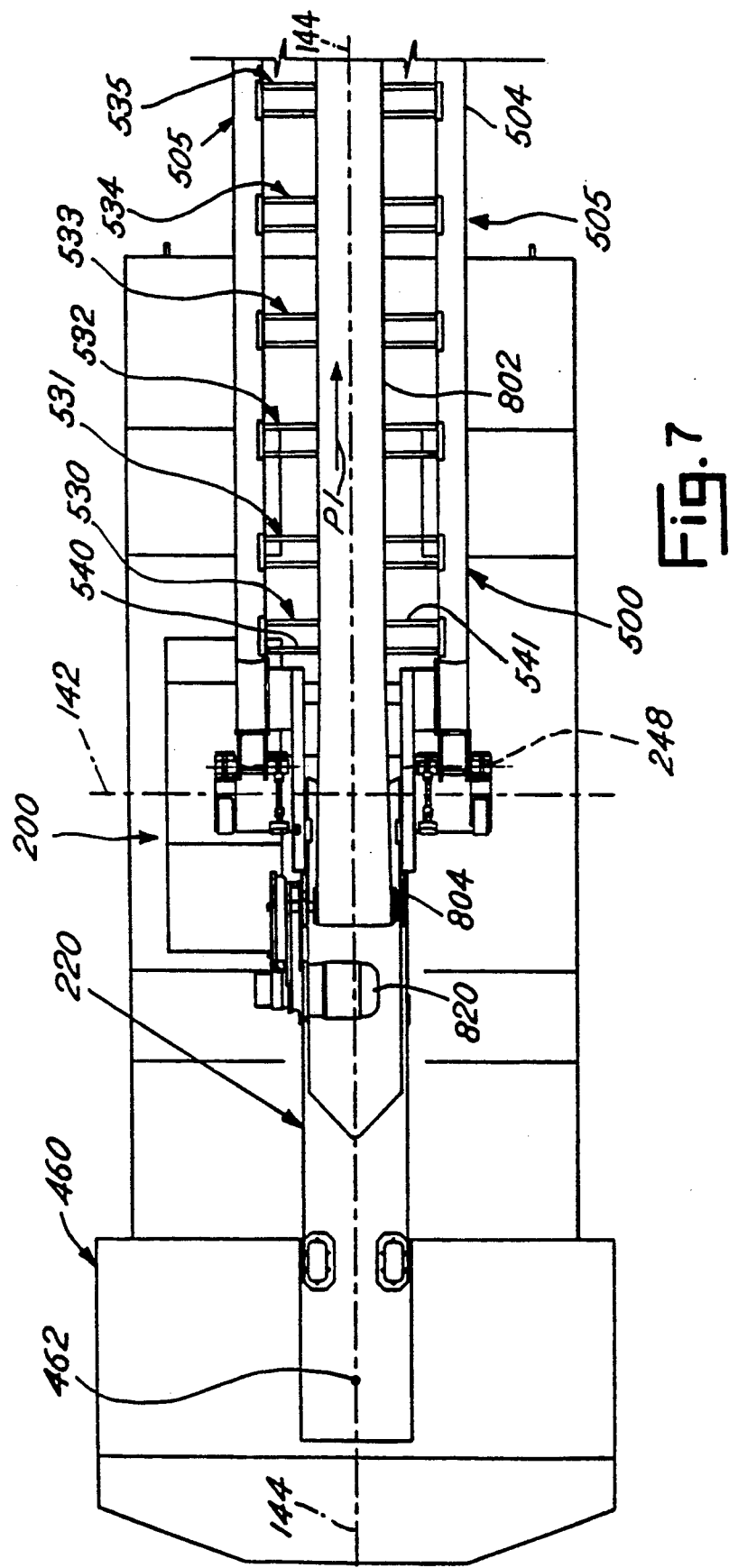
FIG. 7 is a top plan view of the apparatus shown in FIG. 4 with the feeder conveyor and transfer unit removed and certain of the apparatus mounted to the vehicle frame also removed to more clearly show the remaining parts.

Referring to FIGS. 4 and 7, counterbalance 460 is a solid concrete block weighing 80,010 lbs. that is attached to mounting tubes 342 and 343 (FIGS. 18, 19). Counterbalance 460 defines a center of gravity 462 that lies in plane 144 (FIG. 7).

Figure 8:
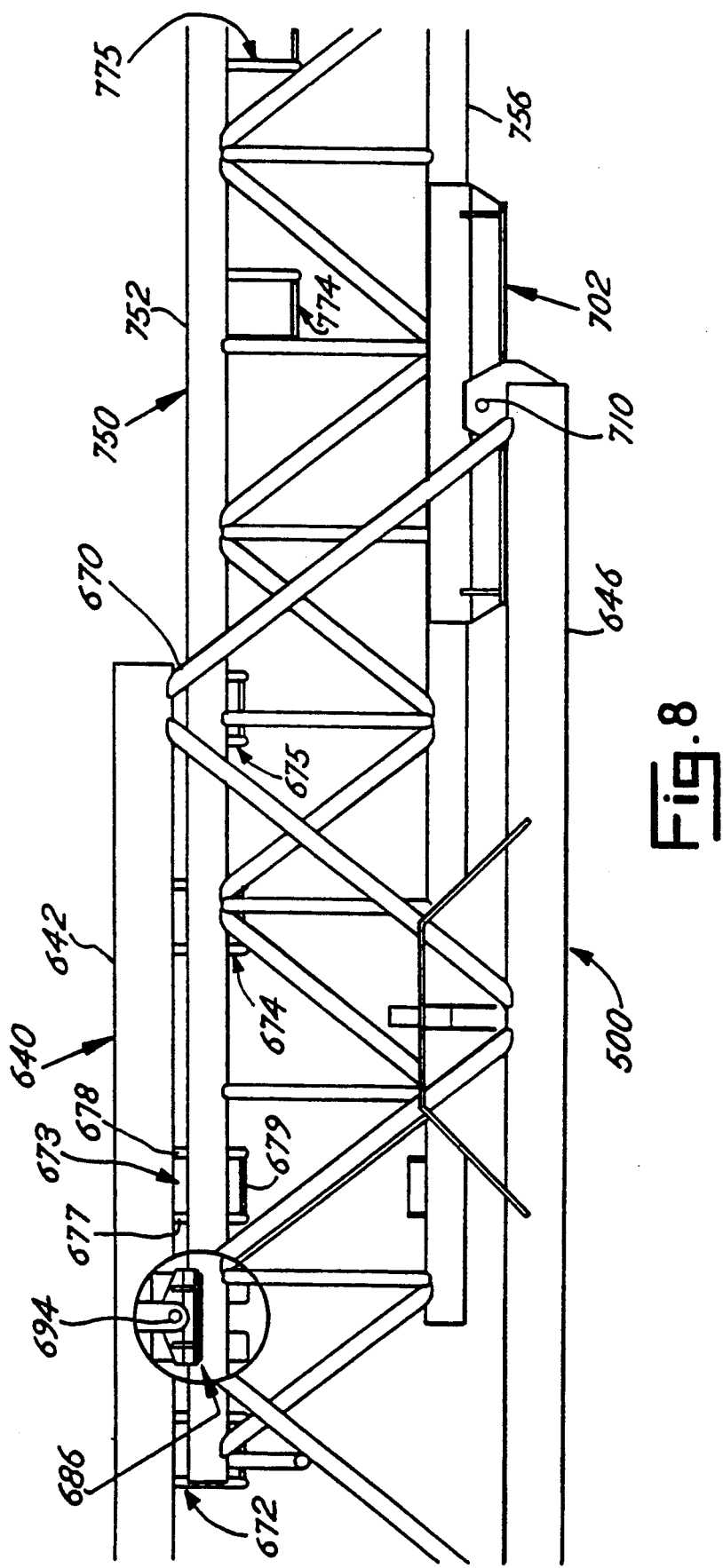
FIG. 8 is an enlarged, fragmentary, side elevational view of a portion of the truss shown in FIG. 1.
Figure 9:
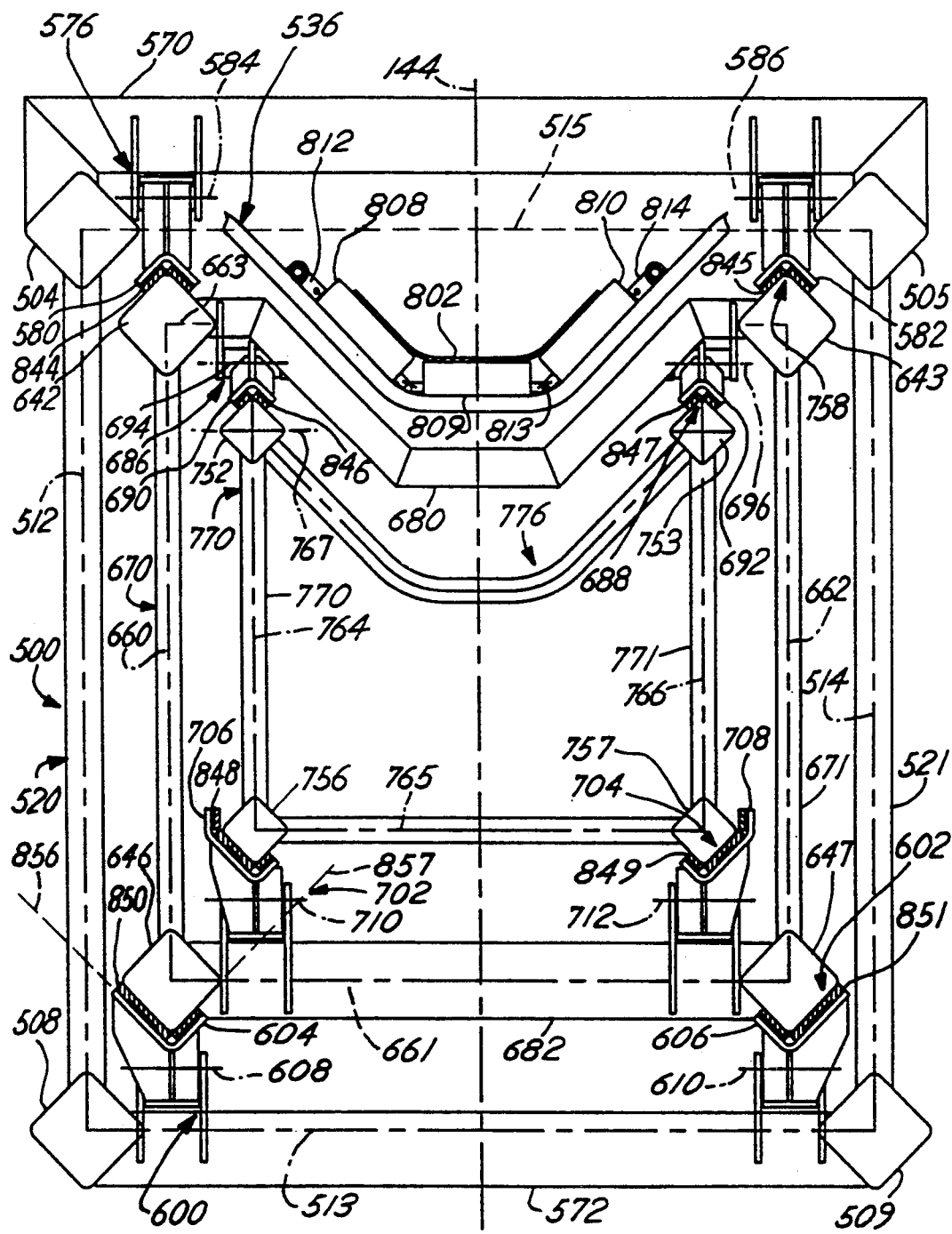
FIG. 9 is an end elevational view of the truss shown in FIG. 1 as viewed from the right with certain parts of the conveyor removed to more clearly reveal the remaining components.

Referring to FIGS. 7-9, truss assembly 500 comprises a base section 502, a mid section 640 and a fly section 750. The truss assembly is fabricated from hollow steel tubing as shown in the drawings (FIG. 10e). Referring to FIGS. 4 and 10a, base section 502 includes a flange 503 that is journaled with journal boxes 244-247 (FIGS. 13-15) and is rotated around axis 248 by elevating assembly 400.

Referring to FIGS. 7-9, base section 502 also includes upper support cords 504 and 505, as well as lower support cords 508 and 509. As shown in FIG. 9, the support cords have a generally square cross section that defines planes 512-515 which pass diagonally through the cross sections. Planes 512 and 514 are parallel to plane 144 and planes 513 and 515 are perpendicular to plane 144. Base section 502 also includes a large number of side braces, such as exemplary braces 520 and 521. Conveyor assembly 800 is supported by a number of pairs of roller support rods, such as exemplary pairs 530-536 (FIGS. 7 and 9). Exemplary pair 530 (FIG. 7) includes rods 540-541 that are joined by several tie bars perpendicular to rods 540 and 541 (not shown).

Referring to FIG. 9, base section 502 also includes an upper brace 570 and a lower brace 572 that support rocker assemblies. More specifically, upper brace 570 supports upper rocker assemblies 576 and 578 that include pad fittings 580 and 582 that rotate around axes 584 and 586, respectively. Lower brace 572 supports lower rocker assemblies 600 and 602 that include pad fittings 604 and 606 which rotate around axes 608 and 610, respectively.

Referring to FIG. 10c, base section 502 includes three double pairs of fixed pad guides 616-618 that are generally aligned with pad fittings 604 and 606 (FIG. 9). Each pad guide includes a pair of guides that position cord 646 (FIG. 10e) and another mirror image pair of guides that position cord 647 (not shown).

Referring to FIGS. 8 and 9, mid-section 640 includes upper support cords 642 and 643 each having inner ends. Inner end 644 of cord 642 is illustrated in FIG. 10a. As shown in FIGS. 8 and 9, mid-section 640 also includes lower support cords 646 and 647. Support cords 642, 643, 646 and 647 define planes 660-663 that pass diagonally through the cross section of the cords as shown. Planes 660 and 662 are parallel to plane 144. Planes 661 and 663 are perpendicular to plane 144. Mid-section 640 also includes numerous side braces, such as exemplary braces 670 and 671. In mid-section 640, conveyor assembly 800 is supported on several pairs of roller support rods, such as exemplary pairs 672-675 (FIG. 8). Exemplary pair 673 includes rods 677 and 678, as well as several tie bars arranged perpendicular to the rods, such as exemplary tie bar 679.

Mid-section 640 also includes an upper brace 680 and a lower brace 682 (FIG. 9). Upper brace 680 supports upper rocker assemblies 686 and 688 that include pad fittings 690 and 692 which rotate around axes 694 and 696. Lower brace 682 support lower rocker assemblies 702 and 704 that have pad fittings 706 and 708 which rotate around axes 710 and 712, respectively.

Referring to FIG. 10c, mid-section 640 includes two double pairs of fixed pad guides 720 and 722 that are aligned generally with pad fittings 706 and 708. Each pad guide includes a pair of guides that position cord 756 and are similar in structure to the guides shown in FIG. 10e. Another mirror image pair of guides (not shown) position cord 757.

Each of pad guide pairs 616-618, 720 and 722 is substantially identical and is illustrated by exemplary pad guide 618 shown in FIGS. 10d and 10e. Pad guide 618 includes an upper pad fitting 620 supported by braces 622 and 623. Pad guide 618 also includes lower pad fitting 630 supported by a brace 632 mounted on brackets 634 and 635. Brackets 634 and 635 are attached to a lower brace 637 similar to brace 572 (FIG. 9). Braces 622 and 623 are securely welded to side braces 625 and 626 that are similar to side brace 520. A pair of upper and lower pad fittings like those illustrated in FIGS. 10d and 10e but not shown is located adjacent cords 509 and 647.

Referring to FIGS. 8 and 9, fly section 750 includes upper support cords 752 and 753, as well as lower support cords 756 and 757. The cords have generally square cross sections which define planes 764-767 that pass diagonally through the cross sections as shown in FIG. 9. Planes 764 and 766 are parallel to plane 144, and planes 765 and 767 are perpendicular to plane 144. Fly section 750 includes numerous side braces, such as exemplary braces 770 and 771. In fly section 750, conveyor assembly 800 is supported by several pairs of roller support rods, such as exemplary pairs 774-776.

Referring to FIGS. 7 and 9, conveyor assembly 800 includes a belt 802 that is carried on conventional rollers on truss sections 502, 640 and 750 according to the teachings of U.S. Pat. No. 3,945,484 issued Mar. 23, 1976 in the name of Robert F. Oury. Those skilled in the art will understand the manner in which belt 802 is supported by rollers on the various sections of the truss without further description. Referring to FIG. 7, belt 802 is caused to move by a conventional drive roller 804. The belt is supported by sets of three support rollers that are carried by the various pairs of roller support rods previously described. Referring to FIG. 9, belt 802 is carried by exemplary rollers 808-810 that are supported by concentric shafts 812-814 which, in turn, are supported by support rod pair 536. As shown in FIG. 7, reference plane 144 bisects conveyor belt 802, as well as truss 500, into two parts. Drive roller 804 is caused to rotate by a conventional motor 820 acting through a conventional pulley drive 822. Motor 820 moves drive roller 804 such that conveyor belt 802 moves concrete or the like in the direction of arrow P1 (FIG. 7). Referring to FIG. 1, wet concrete or the like is conveyed by belt 802 to the end of fly section 750 and is deposited at a construction site through a conventional distribution hose 824. Fly section 750 terminates in a conveyor roller (not shown).

Referring to FIGS. 9 and 10c-10e, pad assembly 840 includes pads 844-851 connected to each of the rocker assemblies as shown. Each of the pads connected to the rocker assemblies defines perpendicular support planes that are shown most clearly in FIG. 9 with respect to exemplary pad 850. Referring to FIG. 9, pad 850 defines support planes 856 and 857 that are perpendicular to each other. Plane 856 makes a positive 45° angle with respect to plane 144, and support plane 857 makes a negative 45° angle with respect to plane 144.

As shown in FIGS. 10d and 10e, each of the fixed double pad guide pairs 616-618, 720 and 722 supports a pair of pads, such as exemplary pads 860 and 861. As shown in FIG. 10e, pad 860 is mounted on fitting 620 and defines a support surface 862 that is parallel to plane 144. Pad 861 defines a surface 863 that is perpendicular to plane 144. The corner of cord 646 slides against and is supported by surface 863 and another corner of cord 646 slides against and is guided by surface 862. According to the preferred practice of the invention, the pads are formed from polyethylene. Experience has shown that polyethylene is able to control and restrain the movement of the mid and fly truss sections, 640 and 750, when they are retracted at high elevational angles. This feature increases the safety of an operator located in cab assembly 200 and enhances the control the operator can exert over the movement of the sections.

Referring to FIG. 10a, bumper assembly 880 comprises a pair of compressor bumpers that are mounted to section 502, including exemplary bumper 882. Bumper 882 is connected to an inner brace 510 of section 502. The outer end of bumper 882 comates with inner end 644 of cord 642 of mid-section 640 of truss assembly 500. The bumpers are manufactured by Energy Kinetics, Inc., Naperville, Ill. under Assembly No. EK-154-7.

In the event that the mid and fly sections of the truss retract too rapidly from a high elevational angle, the compression bumpers absorb shock and prevent damage to the truss and vehicle 100. This is an important feature which substantially increases the reliability and structural integrity of the overall apparatus and is a safety feature for the operator.

Referring to FIG. 11, drive assembly 900 includes a drive cable 902 having a retract side 901 and an extend side 903. Drive assembly 900 also includes equalizer cables 904–907 arranged as shown. A traction drive 910 comprising conventional drive sheaves 912 and 913 enables force to be applied to the extend side or the retract side of the cable 902, thereby enabling the mid and fly sections 640 and 750 to be simultaneously extended or retracted, respectively. Drive cable 902 is tied to the inner end portion of base truss section 502 at tie points 920 and 921 as shown. Cable 904 is fixed to the outer end portion of base section 502 and the inner end portion of fly section 750 at tie points 925 and 924, respectively. Cable 905 is attached to the outer end portion of base section 502 and the inner end portion of fly section 750 at tie points 928 and 929, respectively. Cable 906 is attached to the inner end portion of fly section 750 and the outer end portion of base section 502 at tie points 932 and 933, respectively. Cable 907 is connected to the inner end portion of fly section 750 and the outer end portion of the base section 502 at tie points 936 and 937, respectively.

Drive assembly 900 also includes extension pulleys 940–949 are connected to the inner end portion of mid-section 640 as shown. Extension pulleys 948–949 are connected to the inner end portion of fly section 750 as shown. Extension pulleys 952–955 are connected to the outer end portion of base section 502 as shown. Extension pulleys 958–959 are connected to the outer end portion of mid-section 640 as shown.

Drive assembly 900 also includes a retraction pulley 961 connected to the inner end portion of fly section 750 and retraction pulleys 962–963 connected to the inner end portion of mid-section 640 as shown. Retraction pulleys 966–967 are connected to the inner end portion of base section 502 as shown.

Figure 12:
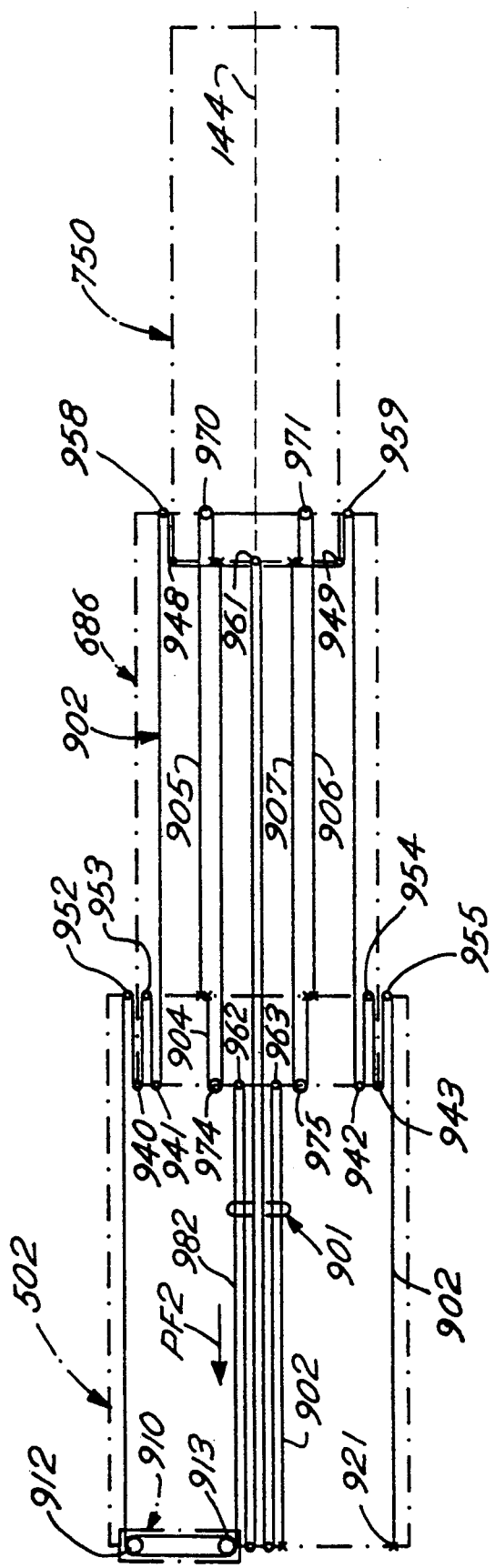
FIG. 12 is a reduced, top plan schematic view of the apparatus shown in FIG. 11 in the extended position.

Drive assembly 900 also includes equalizer pulleys 970–971 connected to the outer end portion of mid-section 640 as shown. Equalizer pulleys 974–975 are connected to the inner end portion of the mid-section 640 as shown. Referring to FIGS. 11 and 12, with the exception of pulley 961, the pulleys are arranged in pairs with one member of each pair located on one side of plane 144 and the opposite member of each pair located on the opposite side of plane 144. The respective pulleys in each pair are located equidistant from plane 144 as shown in FIGS. 11 and 12. Pulley 961 is bisected by plane 144 (FIG. 11). This is an important feature that enables the truss sections to be rapidly and accurately extended and retracted.

In operation, vehicle 100 is positioned at a construction site in the configuration shown in FIG. 1. In this configuration, counterbalance 460 is positioned as close to rear wheel 112 as possible. In order to achieve this result, beam assembly 330 is telescoped inside support weldment 222 to the maximum extent possible. This arrangement is more clearly shown in FIG. 4. During positioning of vehicle 100, the sections of the truss 500 are telescoped together to the maximum extent possible as shown in FIG. 1. Before use, the stabilizer pads, such as 122–123, are lowered in firm contact with supporting surface 116 as shown in FIG. 4. Feed conveyor 446 is then assembled with swivel transfer assembly 440 in the manner shown. Counterweight 460 is then extended toward the rear of vehicle 100 to the position shown in FIG. 3 by extending beam assembly 330 to the left as shown in FIGS. 18 and 19. This is an important feature which enables counterweight 460 to be placed closer to rear wheel 112 for convenient maneuvering, but allows counterweight 460 to be extended to the rear of vehicle 100 to enable maximum extension of truss 500.

Figure 3:
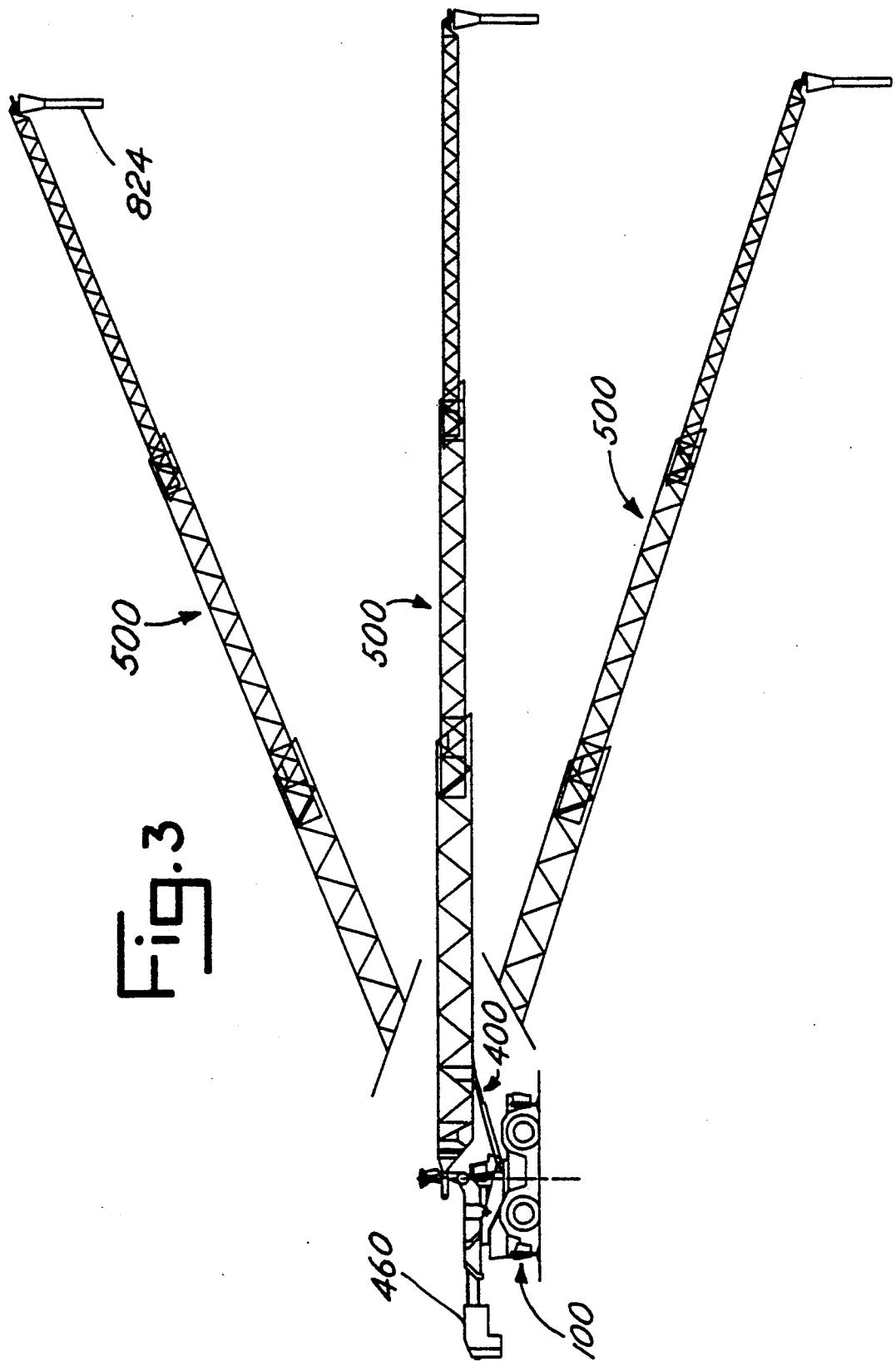
FIG. 3 is a side elevational view of the apparatus shown in FIG. 1 in which the counterweight, truss and conveyor are in an extended position and in which broken views illustrate elevational angles of the truss and conveyor both above and below a horizontal plane.

After counterweight 460 is properly positioned, truss 500 is elevated or lowered to an appropriate angle by operating elevating assembly 400 through hydraulic pressure in a conventional manner. As shown in FIG. 3, truss 500 may be elevated to a high angle above a horizontal plane or to an angle below a horizontal plane to accommodate a variety of different construction sites. When fully extended, as shown in FIG. 3, truss 500 is 200 feet long.

When truss 500 is raised to the highest elevational angle shown in FIG. 3, elevating assembly 400 applies to segment 146 of turntable assembly 130 a component of force in the direction of arrow F1 (FIG. 4). At the same time, strut 290 applies an opposing component of force to segment 146 of turntable assembly 130 in the direction by arrow F2 (FIG. 4). This is an important feature which helps to maintain the balance of vehicle 100 when truss 500 is elevated and is conveying concrete or other heavy materials.

At the same time that the forces indicated by arrows F1 and F2 are being generated, counterweight 460 urges forward frame portion 234 of weldment 222 to rotate in a counterclockwise direction around axis 175 (i.e., in the direction indicated by arrow F3) (FIG. 4). The component of force indicated by arrow F3 is transmitted through strut 290 to turntable assembly 130 to apply a force to segment 146 in the direction of arrow F5. At the same time, the weight of truss 500 and conveyor assembly 800 urges forward frame portion 234 of weldment 222 to rotate in a clockwise direction around axis 175 (i.e., in the direction indicated by arrow F4) (FIG. 4). The component of force indicated by arrow F4 is transmitted through strut 290 to turntable assembly 130 to apply a force to segment 146 in the direction of arrow F6, thereby tending to counterbalance the component of force indicated by arrow F3. This is an important feature of the invention which enables vehicle 100 to be stabilized during operation.

Referring to FIG. 4, the components of forces indicated by arrows F1 and F2 are parallel to plane 114. The force indicated by arrow F1 tends to urge segment 146 of turntable assembly 130 toward reference plane 142 and the force in the direction of arrow F2 tends to urge segment 146 away from reference plane 142 (FIGS. 4 and 5). As shown in FIG. 4, the force indicated by arrows F3 and F4 are parallel to axis of rotation 140. Referring to FIGS. 4 and 5, the weight of truss assembly 500, conveyor assembly 800, and counterweight 460 on pin 175 creates a component of force on segment 148 of turntable 130 centered in plane 144 in the direction of arrow F7 (FIG. 4). This is an important feature which helps to distribute the forces on turntable 130 in both segments 146 and 148 of turntable assembly 130 in order to help stabilize vehicle 100.

Referring to FIG. 11, in order to extend truss sections 640 and 750, traction drive 910 is moved so that an extension force as applied to section 980 of cable 902 in the direction of the arrow PF1. As a result of the extension force, pulleys 940-943 apply a force in the direction of arrow P1 (FIG. 11) to section 640 and pulleys 948 and 949 apply force in the direction of arrow P1 to section 750. Equalizer pulleys 970-971 and 974-975 ensure that both sections 640 and 750 simultaneously move relative to section 502 in a coordinated manner. Relative to section 502, section 750 moves at twice the rate of section 640. After the extension forces have been applied for a period of time, the sections of the truss are arranged as shown in FIG. 12.

In order to retract sections 640 and 750, traction drive 910 is reversed so that section 982 of cable 902 is subjected to a retraction force indicated by arrow PF2 (FIG. 12). With a retraction force applied to cable 902, pulleys 962 and 963 apply a traction force to mid-section 640 in the direction of arrow P2 (FIG. 11) and pulley 961 applies a force to fly section 750 in the direction of arrow P2 (FIG. 11).

Equalizer pulleys 970-971 and 974-975 ensure that mid-section 640 and fly section 750 are retracted simultaneously in direction P2 at a predetermined rate. Preferably, with respect to base section 502, fly section 750 retracts at twice the rate of mid-section 640.

Drive assembly 900 is an important feature that enables mid-section 640 and fly section 750 to be extended and retracted with a degree of safety and accuracy previously unattainable. Since the fly section always moves at twice the rate of the mid-section, the operator always knows the precise location of the unsupported end of fly section 750, thereby substantially aiding the distribution of concrete.

Referring to FIGS. 4 and 5, turntable assembly 130 may be rotated through 360° around axis 140 and truss 500 may be rotated around axis 248 while concrete is continuously fed onto conveyor 802 by means of feeder conveyor 446 and swivel transfer assembly 440. This is an important feature which enables uninterrupted distribution of concrete irrespective of the manner in which turntable 130 is rotated or truss 500 is elevated. This feature is attained to a great extent by the placement of axes 140 and 248 in the relative positions shown in FIGS. 4 and 7.

Those skilled in the art will recognize that the preferred embodiment may be altered and modified without departing from the true spirit and scope of the invention as defined in the accompanying claims.

What is claimed is:

1. Apparatus for conveying concrete and the like comprising in combination:
    self-propelled vehicle means having a first wheel-supporting axle defining a first axle center line and a second wheel-supporting axle defining a second axle center line, said first and second axle center lines defining a first reference plane;
    conveyor means for transporting concrete in a predetermined first path direction defining a second reference plane perpendicular to the first reference plane;
    turntable means supported for rotation on said vehicle means, said turntable means defining an axis of rotation perpendicular to said first reference plane and defining a third reference plane perpendicular to the second reference plane and collinear with the axis of rotation;
    truss means for supporting the conveyor means, said truss means having a supported end portion and a cantilevered end portion;
    drive means for extending the truss means and conveyor means in the first path direction and retracting the truss means and conveyor means in a second path direction opposite the first path direction;
    transfer means for transferring concrete to the conveyor means;
    elevating means supported on a first segment of the turntable means located on a first side of the third reference plane for rotating the truss means around a pivot axis;
    cab means carried by the turntable means and located on one side of the second reference plane for enabling an operator to control the vehicle means and conveyor means, said cab means having a top surface that defines a fourth reference plane parallel to the first reference plane;
    counterbalance means defining a center of gravity located on a second side of the third reference plane opposite the first side for counterbalancing the weight of the truss means and conveyor means; and
    force balancing means for supporting the truss means and the counterbalance means on the turntable means such that the second reference plane passes through the turntable means and the counterbalance means and for positioning the pivot axis above the fourth reference plane, perpendicular to the second reference plane and on the first side of the third reference plane, whereby concrete can be transferred from the transfer means to the conveyor means while the turntable means is rotating around the axis of rotation and whereby an operator can view the operation of the conveyor means.

2. Apparatus, as claimed in claim 1, wherein the truss means comprises a lattice truss fabricated from tubing.

3. Apparatus, as claimed in claim 2, wherein the truss means comprises:
    first section means for engaging the force balancing means;
    second section means for telescoping inside the first section means; and
    third section means for telescoping inside the second section means.

4. Apparatus, as claimed in claim 3, wherein the truss means further comprises improved apparatus for limiting the rate of movement of the second and third section means in the second path direction comprising in combination:
    first pad means carried by the first section means for slidably supporting the second section means on a supporting surface; and
    second pad means carried by the second section means for slidably supporting the third section means on a supporting surface, whereby an operator is protected in the event the drive means fails to control the movement of the second and third section means in the second path direction.

5. Apparatus, as claimed in claim 4, wherein the first pad means is rotatable around a first pad axis perpendicular to the second reference plane and wherein the second pad means is rotatable around a second pad axis perpendicular to the second reference plane.

6. Apparatus, as claimed in claim 5, and further comprising:
    non-rotatable third pad means carried by the first section means for slidably supporting the second section means on one or more supporting surfaces; and non-rotatable fourth pad means carried by the second section means for slidably supporting the third section means on one or more supporting surfaces.

7. Apparatus, as claimed in claim 4, wherein the first and second pad means comprise polyethylene.

8. Apparatus, as claimed in claim 4, wherein the second reference plane divides the conveyor means into a first part and a second part and wherein the first and second pad means each comprise pairs of pads with one pad of each pair being located in the first part and the other pad of each pair being located in the second part.

9. Apparatus, as claimed in claim 8, wherein the supporting surface of each pad means defines a first support plane, and a second support plane wherein the first and second support planes define a first predetermined angle, wherein the first support plane of one pad of each pair makes a positive acute angle with respect to the second reference plane and wherein the first support plane of the other pad of each pair makes a negative acute angle with respect to the second reference.

10. Apparatus, as claimed in claim 9, wherein the positive and negative acute angles are substantially equal.

11. Apparatus, as claimed in claim 10, wherein the first predetermined angle is substantially 90° and wherein the positive and negative acute angles each are substantially 45°.

12. Apparatus, as claimed in claim 3, and further comprising compression means mounted on the first section means for absorbing energy from a collision with the second section means.

13. Apparatus, as claimed in claim 3, wherein the first section means has an inner end portion and an outer end portion, the second section means has an inner end portion and an outer end portion, the third section means has an inner end portion and an outer end portion, and wherein the drive means comprises:
  first cable means for extending or retracting the second and third section means;
  second cable means for equalizing the extending or retracting of the second and third section means;
  cable drive means for applying to the first cable means an extension force or a retraction force;
  first extension pulley means engaging the first cable means and connected to the inner end portions of the second and third section means for simultaneously urging the second and third section means in the first path direction in response to the application of a component of force in the first path direction;
  second extension pulley means engaging the first cable means and connected to the outer end portions of the first and second section means for enabling the first cable means to apply a component of force to the first extension pulley means in the first path direction in response to the application of the extension force by the cable drive means;
  first retraction pulley means engaging the first cable means and connected to the inner end portions of the second and third section means for simultaneously urging the second and third section means in the second path direction in response to the application of a component of force in the second path direction;
  second retraction pulley means engaging the first cable means and connected to the inner end portion of the first section means for enabling the first cable means to apply a component of force to the first retraction pulley means in the second path direction in response to the application of the retraction force by the cable drive means; and
  equalizer pulley means engaging the second cable means and connected to the inner and outer end portions of the second section means for urging the second and third section means to move simultaneously at predetermined rates relative to the first section means.

14. Apparatus, as claimed in claim 13, wherein the third section means moves at double the rate of the second section means relative to the first section means.

15. Apparatus, as claimed in claim 13, wherein the second reference plane divides the conveyor into a first part and a second part and wherein the first and second extension pulley means and the equalizer pulley means each comprise at least one pair of pulleys with one pulley of each pair being located in the first part and the other pulley of each pair being located in the second part.

16. Apparatus, as claimed in claim 15, wherein the pulleys in each said pair are located equidistant from the second reference plane.

17. Apparatus, as claimed in claim 13, wherein the second reference plane divides the conveyor into a first part and a second part and wherein the first retraction pulley means comprises at least one pair of pulleys, one pulley of the pair being located in the first part and the other pulley of the pair being located in the second part.

18. Apparatus, as claimed in claim 17, wherein the first retraction pulley means further comprises a pulley located in the second reference plane and connected to the inner end portion of the third section means.

19. Apparatus, as claimed in claim 18, wherein the second retraction pulley means comprises at least one pair of pulleys, one pulley of the pair being located in the first part and the other pulley of the pair being located in the second part.

20. Apparatus, as claimed in claim 1, wherein said transfer means comprises swivel transfer apparatus defining a central axis and wherein the axis of rotation is substantially collinear with said central axis.

21. Apparatus, as claimed in claim 1, wherein the force balancing means comprises means for aligning the truss means, turntable means and counterbalance means so that the second reference plane passes substantially through the axis of rotation and the center of gravity of the counterbalance means.

22. Apparatus, as claimed in claim 1, wherein:
  the elevating means further comprises means for transferring a first component of force to the turntable means that urges the first segment of the turntable means toward the third reference plane in a first component direction parallel to the first reference plane; and
  the force balancing means further comprises means responsive to the weight of the truss means and conveyor means for transferring a second component of force to the turntable means that opposes the first component of force, responsive to the weight of the counterbalance means for transferring a third component of force to the turntable means that urges the turntable means in a third component direction parallel to the axis of rotation and responsive to the weight of the truss means and conveyor means for transferring a fourth component of force to the turntable means that opposes the third component of force, whereby the reach of the truss means and conveyor means can be extended while maintaining the stability of the self-propelled vehicle means.

23. Apparatus, as claimed in claim 22, wherein the force balancing means comprises means for transferring a first portion of the forces created by the weight of the truss means, conveyor means and counterbalance means to the first segment of the turntable means and for transferring a second portion of the forces created by the weight of the truss means, conveyor means and counterbalance means to the second segment of the turntable means.

24. Apparatus, as claimed in claim 23, wherein the force balancing means comprises:
   shipper means attached to and cantilevered from the second segment of the turntable means;
   arm means having a first end portion for supporting the counterbalance means and also having a second end portion;
   support means for supporting the arm means on the shipper means between the first and second end portions of the arm means so that the weight of the counterbalance means urges the second end portion of the arm means to rotate in a first rotational direction; and
   strut means for interconnecting the second end portion of the arm means, the first segment of the turntable means, and the truss means, for transmitting the second, third and fourth components of force to the turntable means and responsive to the weight of the truss means and conveyor means for urging the second end portion of the arm means to rotate in a second rotational direction opposite the first rotational direction.

25. Apparatus, as claimed in claim 24, wherein the arm means further comprises:
   weldment means supported on the shipper means by the support means and supported on the turntable means by the strut means; and
   beam means for supporting the counterbalance means, said beam means being mounted in telescoping relationship with the weldment means, whereby the counterbalance means can be moved toward the first axle to improve travel mobility.

26. Apparatus for conveying concrete and the like comprising in combination:
   self-propelled vehicle means having a first wheel-supporting axle defining a first axle center line and a second wheel-supporting axle defining a second axle center line, said first and second axle center lines defining a first reference plane;
   conveyer means for transporting concrete in a predetermined first path direction defining a second reference plane perpendicular to the first reference plane;
   turntable means supported for rotation on said vehicle means, said turntable means defining an axis of rotation perpendicular to said first reference plane and defining a third reference plane perpendicular to the second reference plane and collinear with the axis of rotation;
   drive means for extending the conveyor means in the first path direction and retracting the conveyor means in a second path direction opposite the first path direction;
   transfer means for transferring concrete to the conveyor means;
   elevating means supported on a first segment of the turntable means located on a first side of the third reference plane for rotating the conveyor means around a pivot axis;
   cab means carried by the vehicle means for enabling an operator to control the vehicle means and conveyor means, said cab means having a top surface that defines a fourth reference plane parallel to the first reference plane;
   counterbalance means defining a center of gravity located on a second side of the third reference plane opposite the first side for counterbalancing the weight of the conveyor means, said center of gravity defining a fifth reference plane parallel to the first reference plane; and
   force balancing means for supporting the conveyor means, the transfer means and the counterbalance means on the turntable means such that the second reference plane passes through the turntable means and the counterbalance means and the pivot axis lies above the fifth reference plane, perpendicular to the second reference plane and below the transfer means, whereby concrete can be transferred from the transfer means to the conveyor means while the turntable means is rotating around the axis of rotation.

27. Apparatus, as claimed in claim 26, wherein said transfer means comprises swivel transfer apparatus defining a central axis and wherein the axis of rotation is substantially collinear with said central axis.

28. Apparatus, as claimed in 26, wherein the force balancing means comprises means for aligning the turntable means and the counterbalance means so that the second reference plane passes substantially through the axis of rotation and the center of gravity of the counterbalance means.

29. Apparatus, as claimed in claim 26, wherein the force balancing means is arranged on the vehicle means such that the conveyor means extends forward of the cab means when the vehicle means is arranged for transporting the conveyor means.

30. Apparatus, as claimed in claim 26, wherein the transfer means defines a periphery and wherein the pivot axis lies within the projection of the periphery onto the first reference plane.

* * * * *